United States Patent
Swink et al.

(10) Patent No.: US 10,243,910 B2
(45) Date of Patent: *Mar. 26, 2019

(54) SYSTEMS, APPARATUS, METHODS AND COMPUTER-READABLE STORAGE MEDIA FACILITATING HETEROGENEOUS MESSAGING FOR A COMMUNICATION DEVICE

(71) Applicant: AT&T Mobility II LLC, Atlanta, GA (US)

(72) Inventors: Cristy Swink, Davidson, NC (US); Jason Sikes, Carnation, WA (US); David Merkoski, San Francisco, CA (US); Benjamin Fineman, San Francisco, CA (US); Jonathan Solis Snydal, Oakland, CA (US); Megan Elisabeth Knight, Mountain View, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 951 days.

This patent is subject to a terminal disclaimer.

(21) Appl. No.: 14/501,271

(22) Filed: Sep. 30, 2014

(65) Prior Publication Data

US 2015/0017953 A1    Jan. 15, 2015

Related U.S. Application Data

(63) Continuation of application No. 12/903,679, filed on Oct. 13, 2010, now Pat. No. 8,881,025.

(Continued)

(51) Int. Cl.
*G06F 3/0481* (2013.01)
*H04L 12/58* (2006.01)
(Continued)

(52) U.S. Cl.
CPC .......... *H04L 51/32* (2013.01); *G06F 3/0482* (2013.01); *G06F 3/0485* (2013.01);
(Continued)

(58) Field of Classification Search
CPC .. G06F 3/0488; G06F 3/0482; G06F 3/04812; G06F 3/04817; H04L 51/28;
(Continued)

(56) References Cited

U.S. PATENT DOCUMENTS 5,072,412 A    12/1991 Henderson, Jr. et al.
5,233,687 A    8/1993 Henderson, Jr. et al.
(Continued)

FOREIGN PATENT DOCUMENTS

WO    2008107675 A1    9/2008

OTHER PUBLICATIONS

Non-Final Office Action dated Dec. 2, 2015 for U.S. Appl. No. 12/903,632, 72 pages.

(Continued)

*Primary Examiner* — Steven P Sax
(74) *Attorney, Agent, or Firm* — Amin, Turocy & Watson, LLP

(57) ABSTRACT

Apparatus, methods and computer-readable storage media for threading calls and messages are provided. A method can include: receiving messaging content; and displaying the messaging content in a single thread, wherein the messaging content is threaded and a thread of the messaging content comprises at least one text message and at least one call. The method can further include threading the messaging content, wherein the threading comprises ordering the messaging content based, at least, on a time at which received ones of the messaging content are received at a communication device. In various embodiments, the messaging content can include one or more of voice information, MMS or SMS text (Continued)

messages, voicemail information, system messages, email messages, instant messages, pictorial information, video information or audio information, data traffic information, user-opted notifications, traffic reports, news alerts, weather information, stock reports, social networking chats, social networking posts or social networking status updates.

20 Claims, 10 Drawing Sheets

Related U.S. Application Data

(60) Provisional application No. 61/251,717, filed on Oct. 14, 2009.

(51) Int. Cl.
| | | |
|---|---|---|
| *G06F 3/0482* | (2013.01) | |
| *H04W 4/80* | (2018.01) | |
| *G06F 9/451* | (2018.01) | |
| *H04M 1/725* | (2006.01) | |
| *H04W 4/12* | (2009.01) | |
| *H04W 4/14* | (2009.01) | |
| *G06F 3/0488* | (2013.01) | |
| *H04L 29/12* | (2006.01) | |
| *H04L 29/06* | (2006.01) | |
| *G06F 3/0485* | (2013.01) | |
| *G06Q 50/00* | (2012.01) | |
| *G06F 3/0484* | (2013.01) | |
| *H04L 29/08* | (2006.01) | |
| *H04W 84/12* | (2009.01) | |

(52) U.S. Cl.
CPC ...... *G06F 3/04817* (2013.01); *G06F 3/04883* (2013.01); *G06F 9/451* (2018.02); *H04L 51/04* (2013.01); *H04L 51/10* (2013.01); *H04L 51/16* (2013.01); *H04L 51/28* (2013.01); *H04L 51/36* (2013.01); *H04L 61/1594* (2013.01); *H04L 63/0892* (2013.01); *H04M 1/7255* (2013.01); *H04M 1/72547* (2013.01); *H04M 1/72552* (2013.01); *H04M 1/72555* (2013.01); *H04M 1/72583* (2013.01); *H04W 4/12* (2013.01); *H04W 4/14* (2013.01); *H04W 4/80* (2018.02); *G06F 3/04845* (2013.01); *G06Q 50/01* (2013.01); *H04L 67/02* (2013.01); *H04W 84/12* (2013.01)

(58) Field of Classification Search
CPC ......... H04L 51/32; H04L 51/01; H04L 51/02; H04L 51/03; H04M 1/07; H04W 4/01; H04W 84/01; G06Q 50/01
See application file for complete search history.

(56) References Cited

U.S. PATENT DOCUMENTS

| | | | |
|---|---|---|---|
| 5,394,521 A | 2/1995 | Henderson, Jr. et al. | |
| 5,838,326 A | 11/1998 | Card et al. | |
| 5,847,709 A | 12/1998 | Card et al. | |
| 6,269,369 B1 | 7/2001 | Robertson | |
| 6,351,764 B1 * | 2/2002 | Voticky | G06Q 10/107 709/206 |
| 6,367,020 B1 | 4/2002 | Klein | |
| 6,401,209 B1 | 6/2002 | Klein | |
| 6,633,630 B1 * | 10/2003 | Owens | H04L 51/066 379/100.08 |
| 7,269,727 B1 | 9/2007 | Mukherjee et al. | |
| 7,286,063 B2 | 10/2007 | Gauthey et al. | |
| 7,308,926 B1 | 12/2007 | Hawkins | |
| 7,322,626 B2 | 1/2008 | Thomas | |
| 7,324,333 B2 | 1/2008 | Allen | |
| 7,376,669 B2 | 5/2008 | Klein | |
| 7,443,665 B2 | 10/2008 | Allen | |
| 7,453,443 B2 | 11/2008 | Rytivaara et al. | |
| 7,478,436 B1 | 1/2009 | Sheih et al. | |
| 7,606,024 B2 | 10/2009 | Boss et al. | |
| 7,620,982 B2 | 11/2009 | Ishidera | |
| 7,628,335 B2 | 12/2009 | Morimoto et al. | |
| 7,636,033 B2 | 12/2009 | Golden | |
| 7,640,293 B2 | 12/2009 | Wilson et al. | |
| 7,657,849 B2 | 2/2010 | Chaudhri et al. | |
| 7,761,814 B2 | 7/2010 | Rimas-Ribikauskas et al. | |
| 7,933,609 B2 | 4/2011 | Lagerstedt et al. | |
| 7,953,859 B1 | 5/2011 | Kiefhaber et al. | |
| 7,974,414 B2 * | 7/2011 | Burns | H04M 1/72547 380/247 |
| 8,108,781 B2 | 1/2012 | Laansoo et al. | |
| 8,316,095 B1 | 11/2012 | Wheeler, Jr. et al. | |
| 8,484,564 B1 | 7/2013 | Marti et al. | |
| 8,543,927 B1 | 9/2013 | McKinley et al. | |
| 8,676,901 B1 | 3/2014 | Nicolaou et al. | |
| 8,881,025 B2 * | 11/2014 | Swink | G06F 3/0482 715/752 |
| 2001/0044903 A1 | 11/2001 | Yamamoto et al. | |
| 2002/0056046 A1 | 5/2002 | Klein | |
| 2002/0077079 A1 | 6/2002 | Ishihara | |
| 2002/0099960 A1 | 7/2002 | Klein | |
| 2002/0114654 A1 | 8/2002 | Abe | |
| 2003/0023688 A1 | 1/2003 | Denenberg et al. | |
| 2003/0025840 A1 | 2/2003 | Arling | |
| 2003/0074575 A1 | 4/2003 | Hoberock et al. | |
| 2003/0074590 A1 | 4/2003 | Fogle et al. | |
| 2003/0120957 A1 | 6/2003 | Pathiyal | |
| 2003/0172495 A1 | 9/2003 | Pan | |
| 2003/0184592 A1 | 10/2003 | Awada et al. | |
| 2003/0191960 A1 | 10/2003 | Hung-yi | |
| 2003/0206224 A1 | 11/2003 | Sakakibara et al. | |
| 2004/0034561 A1 | 2/2004 | Smith | |
| 2004/0046018 A1 | 3/2004 | Dobbins | |
| 2004/0082322 A1 | 4/2004 | Tani | |
| 2004/0085351 A1 | 5/2004 | Tokkonen | |
| 2004/0092247 A1 | 5/2004 | Tani | |
| 2004/0113491 A1 | 6/2004 | Mauser | |
| 2004/0113819 A1 | 6/2004 | Gauthey | |
| 2004/0123135 A1 | 6/2004 | Goddard | |
| 2004/0137884 A1 | 7/2004 | Engstrom et al. | |
| 2004/0189439 A1 | 9/2004 | Cansino | |
| 2004/0220913 A1 | 11/2004 | Walker | |
| 2005/0085215 A1 | 4/2005 | Kokko et al. | |
| 2005/0091272 A1 | 4/2005 | Smith et al. | |
| 2005/0117564 A1 | 6/2005 | Vieri et al. | |
| 2005/0234910 A1 | 10/2005 | Buchheit et al. | |
| 2005/0253817 A1 | 11/2005 | Rytivaara et al. | |
| 2005/0282135 A1 | 12/2005 | Berman | |
| 2006/0012577 A1 | 1/2006 | Kyrola | |
| 2006/0041645 A1 | 2/2006 | Zhang et al. | |
| 2006/0052091 A1 | 3/2006 | Onyon et al. | |
| 2006/0075250 A1 | 4/2006 | Liao | |
| 2006/0101350 A1 | 5/2006 | Scott | |
| 2006/0123347 A1 | 6/2006 | Hewitt et al. | |
| 2006/0176661 A1 | 8/2006 | Allen | |
| 2006/0184351 A1 | 8/2006 | Corston-Oliver et al. | |
| 2006/0195474 A1 | 8/2006 | Cadiz et al. | |
| 2006/0253371 A1 | 11/2006 | Rutt et al. | |
| 2006/0255907 A1 | 11/2006 | Min | |
| 2006/0271526 A1 | 11/2006 | Charnock et al. | |
| 2006/0282772 A1 | 12/2006 | Chamberlin et al. | |
| 2006/0291157 A1 | 12/2006 | Allen | |
| 2006/0291158 A1 | 12/2006 | Allen | |
| 2007/0022163 A1 | 1/2007 | Wormald et al. | |
| 2007/0085839 A1 | 4/2007 | Yang et al. | |
| 2007/0088687 A1 | 4/2007 | Bromm et al. | |
| 2007/0119952 A1 | 5/2007 | Morimoto et al. | |
| 2007/0133771 A1 | 6/2007 | Stifelman et al. | |
| 2007/0133802 A1 | 6/2007 | Yuan | |
| 2007/0135091 A1 | 6/2007 | Wassingbo | |
| 2007/0144225 A1 | 6/2007 | Tamura | |
| 2007/0150842 A1 | 6/2007 | Chaudhri et al. | |

(56) References Cited

U.S. PATENT DOCUMENTS

| | | |
|---|---|---|
| 2007/0161410 A1 | 7/2007 | Huang et al. |
| 2007/0203982 A1 | 8/2007 | Jagoe et al. |
| 2007/0204064 A1 | 8/2007 | Mail et al. |
| 2007/0220542 A1 | 9/2007 | Kim |
| 2007/0247276 A1 | 10/2007 | Murchison et al. |
| 2007/0274300 A1 | 11/2007 | Chu et al. |
| 2007/0282839 A1 | 12/2007 | Walker |
| 2008/0036743 A1 | 2/2008 | Westerman et al. |
| 2008/0036747 A1 | 2/2008 | Hope |
| 2008/0049135 A1 | 2/2008 | Okudaira |
| 2008/0055269 A1 | 3/2008 | Lemay et al. |
| 2008/0055276 A1 | 3/2008 | Chang |
| 2008/0059880 A1 | 3/2008 | Cato et al. |
| 2008/0064370 A1 | 3/2008 | Fukaya et al. |
| 2008/0082421 A1 | 4/2008 | Onyon et al. |
| 2008/0089587 A1 | 4/2008 | Kim et al. |
| 2008/0122796 A1 | 5/2008 | Jobs et al. |
| 2008/0153459 A1 | 6/2008 | Kansal et al. |
| 2008/0182563 A1 | 7/2008 | Wugofski et al. |
| 2008/0189122 A1 | 8/2008 | Coletrane et al. |
| 2008/0189623 A1 | 8/2008 | Patil |
| 2008/0207166 A1 | 8/2008 | Aerrabotu et al. |
| 2008/0222636 A1 | 9/2008 | Wang et al. |
| 2008/0229397 A1 | 9/2008 | Basner et al. |
| 2008/0256170 A1 | 10/2008 | Hayashi et al. |
| 2008/0281610 A1 | 11/2008 | Yoshida et al. |
| 2009/0006991 A1 | 1/2009 | Lindberg et al. |
| 2009/0029674 A1 | 1/2009 | Brezina et al. |
| 2009/0034804 A1 | 2/2009 | Cho et al. |
| 2009/0040018 A1 | 2/2009 | Lee et al. |
| 2009/0044578 A1 | 2/2009 | Boss et al. |
| 2009/0061823 A1 | 3/2009 | Chu |
| 2009/0064055 A1 | 3/2009 | Chaudhri et al. |
| 2009/0066489 A1 | 3/2009 | Golden |
| 2009/0102803 A1 | 4/2009 | Newman et al. |
| 2009/0104925 A1 | 4/2009 | Aula |
| 2009/0106247 A1 | 4/2009 | Daughtry et al. |
| 2009/0106415 A1 | 4/2009 | Brezina et al. |
| 2009/0119678 A1 | 5/2009 | Shih et al. |
| 2009/0128335 A1 | 5/2009 | Leung |
| 2009/0138562 A1 | 5/2009 | Schmulen et al. |
| 2009/0157732 A1 | 6/2009 | Hao et al. |
| 2009/0167717 A1 | 7/2009 | Wang et al. |
| 2009/0170553 A1 | 7/2009 | Wang et al. |
| 2009/0177981 A1 | 7/2009 | Christie et al. |
| 2009/0187676 A1 | 7/2009 | Griffin et al. |
| 2009/0209235 A1 | 8/2009 | Lawler et al. |
| 2009/0209243 A1* | 8/2009 | Brown .................... H04L 51/12 455/418 |
| 2009/0215479 A1 | 8/2009 | Karmarkar |
| 2009/0217211 A1 | 8/2009 | Hildreth et al. |
| 2009/0222748 A1 | 9/2009 | Lejeune et al. |
| 2009/0234935 A1 | 9/2009 | Watson et al. |
| 2009/0245484 A1 | 10/2009 | Bates |
| 2009/0248844 A1 | 10/2009 | Sommer et al. |
| 2009/0259968 A1 | 10/2009 | Hsieh et al. |
| 2009/0264117 A1 | 10/2009 | Hsieh et al. |
| 2009/0264157 A1 | 10/2009 | Hsieh et al. |
| 2009/0265666 A1 | 10/2009 | Hsieh et al. |
| 2009/0288032 A1 | 11/2009 | Chang et al. |
| 2009/0296913 A1 | 12/2009 | Thomas et al. |
| 2009/0327263 A1 | 12/2009 | Maghoul |
| 2010/0001967 A1 | 1/2010 | Yoo |
| 2010/0009727 A1 | 1/2010 | Presutti |
| 2010/0071423 A1 | 3/2010 | Dehaan et al. |
| 2010/0079380 A1 | 4/2010 | Nurmi |
| 2010/0082684 A1 | 4/2010 | Churchill et al. |
| 2010/0094939 A1 | 4/2010 | Cheng et al. |
| 2010/0105440 A1 | 4/2010 | Kruzeniski et al. |
| 2010/0123724 A1 | 5/2010 | Moore et al. |
| 2010/0127998 A1 | 5/2010 | Hyun |
| 2010/0145951 A1 | 6/2010 | Van Coeverden De Groot et al. |
| 2010/0156594 A1 | 6/2010 | Chaikin et al. |
| 2010/0159944 A1 | 6/2010 | Pascal et al. |
| 2010/0159995 A1 | 6/2010 | Stallings et al. |
| 2010/0162133 A1 | 6/2010 | Pascal et al. |
| 2010/0164740 A1 | 7/2010 | Lo et al. |
| 2010/0199359 A1 | 8/2010 | Cao et al. |
| 2010/0207723 A1 | 8/2010 | Cao et al. |
| 2010/0214237 A1 | 8/2010 | Echeverri et al. |
| 2010/0223097 A1 | 9/2010 | Kramer et al. |
| 2010/0235733 A1 | 9/2010 | Drislane et al. |
| 2010/0241971 A1 | 9/2010 | Zuber |
| 2010/0251116 A1 | 9/2010 | Rimas-Ribikauskas et al. |
| 2010/0257490 A1 | 10/2010 | Lyon et al. |
| 2010/0309149 A1 | 12/2010 | Blumenberg et al. |
| 2010/0317335 A1 | 12/2010 | Borovsky et al. |
| 2010/0325155 A1 | 12/2010 | Skinner et al. |
| 2011/0010656 A1 | 1/2011 | Mokotov |
| 2011/0035673 A1 | 2/2011 | Chou et al. |
| 2011/0035708 A1 | 2/2011 | Damale |
| 2011/0062143 A1 | 3/2011 | Satanek |
| 2011/0081922 A1 | 4/2011 | Chandra et al. |
| 2011/0169909 A1 | 7/2011 | Gu |
| 2011/0179387 A1 | 7/2011 | Shaffer et al. |
| 2012/0030287 A1 | 2/2012 | Leonard |
| 2012/0303712 A1 | 11/2012 | Polis et al. |
| 2012/0319985 A1 | 12/2012 | Moore et al. |
| 2013/0205243 A1 | 8/2013 | Rivera et al. |
| 2014/0082557 A1 | 3/2014 | Warner |
| 2014/0222577 A1 | 8/2014 | Abhyanker |
| 2014/0258897 A1 | 9/2014 | Shiplacoff et al. |
| 2015/0193132 A1 | 7/2015 | Fagans |

OTHER PUBLICATIONS

Office Action dated Apr. 14, 2016 for U.S. Appl. No. 14/543,872, 92 pages.

Notice of Allowance dated Jun. 28, 2016 for U.S. Appl. No. 12/903,618, 21 Pages.

Office Action dated Jun. 14, 2016 for U.S. Appl. No. 12/903,632, 31 pages.

Office Action dated Nov. 14, 2011 for U.S. Appl. No. 12/643,726, 59 Pages.

Spagnuolo, "How to Use Tweetdeck: The Ultimate Twitter Client," Chris Spagnuolo's EdgeHopper: Tales from the Edge of Technology, Feb. 9, 2009,11 Pages, Last accessed Oct. 26, 2011.

Office Action dated Apr. 6, 2012 for U.S. Appl. No. 12/643,726, 43 Pages.

Office Action dated Jun. 12, 2012 for U.S. Appl. No. 12/903,618, 41 Pages.

Fitz, "AddressBooker & Exporting my Facebook Phonebook," Brad's Life, Nov. 30, 2008, 9 Pages, Last accessed Jun. 19, 2012.

Office Action dated Aug. 1, 2012 for U.S. Appl. No. 12/903,632, 47 Pages.

Office Action dated Sep. 7, 2012 for U.S. Appl. No. 12/902,979, 63 Pages.

Office Action dated Feb. 11, 2013 for U.S. Appl. No. 12/902,979, 53 Pages.

Office Action dated Jan. 30, 2013 for U.S. Appl. No. 12/903,632, 28 Pages.

Office Action dated Mar. 13, 2013 for U.S. Appl. No. 12/643,726, 55 Pages.

Office Action dated Dec. 20, 2012 for U.S. Appl. No. 12/903,679, 40 Pages.

Office Action dated Jun. 13, 2013 for U.S. Appl. No. 12/903,382, 53 Pages.

Office Action dated May 14, 2013 for U.S. Appl. No. 12/903,414, 62 Pages.

Office Action dated Jun. 18, 2014 for U.S. Appl. No. 12/643,726, 55 Pages.

Office Action dated Aug. 23, 2013 for U.S. Appl. No. 12/643,726, 61 Pages.

Office Action dated Nov. 1, 2013 for U.S. Appl. No. 12/903,382, 30 Pages.

Office Action dated Sep. 26, 2013 for U.S. Appl. No. 12/903,618, 36 Pages.

Office Action dated Oct. 11, 2013 for U.S. Appl. No. 12/903,679, 22 Pages.

(56) References Cited

OTHER PUBLICATIONS

Office Action dated Aug. 26, 2014 for U.S. Appl. No. 12/903,618, 25 Pages.
Office Action dated Sep. 23, 2014 for U.S. Appl. No. 12/903,382, 32 Pages.
Office Action dated Sep. 30, 2014 for U.S. Appl. No. 12/643,726, 63 Pages.
Notice of Allowance dated Jun. 27, 2014 for U.S. Appl. No. 12/903,679, 29 Pages.
Office Action dated Jan. 31, 2014 for U.S. Appl. No. 12/903,679, 17 Pages.
"Global Framework—UE Flows and Screen Details," AT&T Armstrong Project, 2009, 166 Pages, Version 1.10, Last accessed Jun. 16, 2010.
"Global Framework—VD Specification," AT&T Armstrong Project, 2009, Version 1.11, 117 Pages, Last accessed Jun. 16, 2010.
"Phone Top—UE Flows and Screen Details," AT&T Armstrong Project, 2009, Version 1.18, 104 Pages, Last accessed Jun. 16, 2010.
"Phone Top—VD Specification," AT&T Armstrong Project, 2009, Version 1.12, 52 Pages, Last accessed Jun. 16, 2010.
"Phone/Dialer—UE Flows and Screen Details," AT&T Armstrong Project, 2009, Version 1.8, 57 Pages, Last accessed Jun. 16, 2010.
"Dialer—VD Specification," AT&T Armstrong Project, 2009, Version 1.7, 19 Pages, Last accessed Jun. 16, 2010.
"Contacts—UE Flows and Screen Details," AT&T Armstrong Project, 2009, Version 2.6, 142 Pages, Last accessed Jun. 16, 2010.
"Contacts—VD Specification," AT&T Armstrong Project, 2009, Version 2.2, 48 Pages, Last accessed Jun. 16, 2010.
"Third-Party Pickers—UE Flows and Screen Details," AT&T Armstrong Project, 2009, Version 1.1, 23 Pages, Last accessed Jun. 16, 2010.
"3rd Party Pickers," AT&T C@lumbus Project, 2009, Version 1.1, 7 Pages, Last accessed Jun. 16, 2010.
"Social—UE Flows and Screen Details," AT&T C@lumbus Project, 2009, Version 1.5, 107 Pages, Last accessed Jun. 16, 2010.
"Social—VD Specification," AT&T C@lumbus Project, 2009, Version 1.5, 39 Pages, Last accessed Jun. 16, 2010.
"Media App—UE Flows and Screen Details," AT&T Armstrong Project, 2009, Version 1.6, 118 Pages, Last accessed Jun. 16, 2010.
"Media—VD Specification," AT&T Armstrong Project, 2009, Version 1.3, 29 Pages, Last accessed Jun. 16, 2010.
"Mobile Share—Reduced Scope—UE Flows and Screen Details," AT&T Armstrong Project, 2009, Version 1.2 RS., 59 Pages, Last accessed Jun. 16, 2010.
"Mobile Share (Reduced Scope)," AT&T Armstrong Project, 2009, Version 1.2RS, 15 Pages, Last accessed Jun. 16, 2010.
"Camera App—UE Flows and Screen Details," AT&T Armstrong Project, 2009, Version 1.8, 77 Pages, Last accessed Jun. 16, 2010.
"Camera—VD Specification," AT&T Project, 2009, Version 1.8, 22 Pages, Last accessed Jun. 16, 2010.
"Alarm Clock—UE Flows and Screen Details," AT&T Armstrong Project, 2009, Version 1.4, 35 Pages, Last accessed Jun. 16, 2010.
"Alarm Clock—VD Specification," AT&T Armstrong Project, 2009, Version 1.4, 18 Pages, Last accessed Jun. 16, 2010.
"Settings—UE Flows and Screen Details," AT&T Armstrong Project, 2009, Version 1.18, 180 Pages, Last accessed Jun. 16, 2010.
"Settings—VD Specification," AT&T Armstrong Project, 2009, Version 1.8, 40 Pages, Last accessed Jun. 16, 2010.
"Conversations—UE Flows and Screen Details," AT&T Armstrong Project, 2009, Version 1.3, 148 Pages, Last accessed Jun. 16, 2010.
"Conversations," AT&T Armstrong Project, 2009, Version 1.5, 54 Pages, Last accessed Jun. 16, 2010.
"Firmware Over the Air Updates—UE Flows and Screen Details," AT&T Armstrong Project, 2009, Version 1.9, 39 Pages, Last accessed Jun. 16, 2010.
McDougall, "Browser," AT&T Armstrong Project, 2009, Version 1.3, 6 Pages, Last accessed Jun. 16, 2010.
McDougall, "Maps," AT&T Armstrong Project, 2009, Version 1.3, 8 Pages, Last accessed Jun. 16, 2010.
"Reference Guide—Icons," AT&T Armstrong Project, 2009, Version 1.0, 4 Pages, Last accessed Jun. 16, 2010.
Henderson, Jr., et al., "Rooms: The Use of Multiple Virtual Workspaces to Reduce Space Contention in a Window-Based Graphical User Interface," Jul. 1989, pp. 211-243, vol. 5, Issue 3, ACM Transactions on Graphics, Last accessed Jan. 14, 2015.
Foremski, "Pana.ma: Kill Voicemail and Texting With Voice Messaging . . . ," Silicone Valley Watcher, Apr. 26, 2010, 4 Pages, Last accessed Jan. 14, 2015.
Bosco, "Offical Google Blog: Receive and Reply to SMS Messages by Email," Sep. 9, 2009, 7 Pages, Google, Last accessed Jan. 14, 2015.
Tedeschi, "Group Texting Grows Up, With Features That Appeal to Adults," Oct. 20, 2010, 4 Pages, NYTimes.com, Last accessed Nov. 1, 2010.
Miller, "A Teenager's Dream: An iPhone App for Free Texting," Bits Blog, Aug. 25, 2009, 19 Pages, NYTimes.com, Last accessed Oct. 13, 2009.
"Build and Grow With Facebook Connect," 2009, 2 Pages, Facebook, Last accessed Nov. 2, 2009.
"Build and Grow With Facebook Connect," 2009, 1 Page, Facebook, Last acceseed Nov. 2, 2009.
"Move Around on Your Phone", pp. 44 and 57-58, Section 2B, Last accessed Nov. 6, 2009.
"MTN—Meeting the Needs of the South African Market for a New Mobile Messaging Solution—Mobile IM," 5 Pages, Movius Interactive Corporation, Last accessed Nov. 2, 2009.
Kevin, "Social Web Aggregation," Feb. 11, 2007, 4 Pages, b5media, Last accessed Nov. 6, 2009.
"Social Media Aggregation & Lifestreaming—All of Your Web Activity in One Simple, and Potentially Inconvenient Place," Alexander the Late, Feb. 11, 2008, 3 Pages, Last accessed Nov. 3, 2009.
Schroeder, "20 Ways to Aggregate Your Social Networking Profiles," Jul. 17, 2007, 20 Pages, Last accessed Nov. 6, 2009.
Hirsch, "iPhone 2.0 Apps: The Social Networking App Comparison," Jul. 17, 2008, 9 Pages, Last accessed Nov. 6, 2009.
"Lifestream: Bebo's New Social Media Aggregation Tool," PDA The Digital Content Blog, Feb. 23, 2009, 3 Pages, Last Accessed Nov. 6, 2009.
"Social Network Aggregation," Wikipedia, 3 Pages, Last Accessed Nov. 6, 2009.
"Your Conversation," Jaiku, 2009, 3 Pages, Google, Inc., Last accessed Nov. 6, 2009.
"Personalized Recommendations to Help You Discover the Best of the . . . ," 2 Pages, StumbleUpon, Last accessed Nov. 6, 2009.
"About Disney Interactive Media Group," The Walt Disney Internet Group, 1 Page, Last accessed Nov. 6, 2009.
"Delicioussocial Bookmarking," 6 Pages, Last accessed Nov. 6, 2009.
"Google Wave," Wikipedia, 2009, 5 Pages, Last accessed Dec. 18, 2009.
"Motorola Backflip (TM)" Wireless From AT&T, 2 Pages, Last Accessed Mar. 29, 2010.
"Motoblur," Motorola USA, 3 Pages, Last accessed Mar. 29, 2010.
Sprint, "Palm Pre Phone User Guide," 2009, 388 Pages, Palm, Inc., United States.
Office Action dated Jan. 28, 2015 for U.S. Appl. No. 12/903,382, 57 Pages.
Office Action dated Mar. 10, 2015 for U.S. Appl. No. 12/903,618, 24 Pages.
Office Action dated Sep. 14, 2015 for U.S. Appl. No. 12/643,726, 73 Pages.
Office Action dated Jul. 29, 2015 for U.S. Appl. No. 12/903,618, 24 Pages.
Gross, et al., "Information Revelation and Privacy in Online Social Networks," Workshop on Privacy in the Electronic Society, Nov. 2005, pp. 71- 80, ACM, Alexandria, Virginia, 10 Pages.
Office Action dated Dec. 14, 2017 for U.S. Appl. No. 15/277,407, 58 pages.
Non-Final Office Action dated May 18, 2018 for U.S. Appl. No. 15/243,459, 125 pages.
Notice of Allowance dated Jun. 15, 2018 for U.S. Appl. No. 15/277,407, 28 pages.

(56) References Cited

OTHER PUBLICATIONS

Office Action dated Dec. 27, 2018 for U.S. Appl. No. 15/243,459, 82 pages.

* cited by examiner

SYSTEMS, APPARATUS, METHODS AND COMPUTER-READABLE STORAGE MEDIA FACILITATING HETEROGENEOUS MESSAGING FOR A COMMUNICATION DEVICE

CROSS-REFERENCES TO RELATED APPLICATIONS

This application is a continuation of U.S. application Ser. No. 12/903,679, filed Oct. 13, 2010 and entitled SYSTEMS, APPARATUS, METHODS AND COMPUTER-READABLE STORAGE MEDIA FACILITATING HETEROGENEOUS MESSAGING FOR A COMMUNICATION DEVICE, which claims priority to and the benefit of U.S. Provisional Application No. 61/251,717, filed Oct. 14, 2009, and titled "SYSTEMS, METHODS AND APPARATUS FOR NEXT-GENERATION MOBILE MESSAGING," the entire contents of which are incorporated herein by reference. This application is related to U.S. Non-Provisional patent application Ser. No. 12/643,726, filed Dec. 21, 2009, titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY."

BACKGROUND

With advancements in technology, the amount and different types of information that users can access over wireless networks is growing rapidly. Similarly, mobile devices are becoming ubiquitous due to convenience of use resultant from their lightweight nature. Users are also pushing the envelope on the applications and information that are required to be provided via the devices to maintain contact with friends and colleagues. Varied types of communication can be facilitated with communication devices. For example, voice calls and messaging can be facilitated with communication devices. However, due to the distinct treatment and handling of different types of information, processing voice call and messages heterogeneously can be a complex task. Further, because voice calls are real-time traffic while messages are non-real-time traffic, handling or displaying voice traffic similar to the way that messages are displayed can leave the user confused and the ease of use of the communication device reduced. As such, systems, apparatus, methods and computer-readable storage media for facilitating heterogeneous messaging are desirable.

SUMMARY

The following presents a simplified summary in order to provide a basic understanding of various aspects described herein. The summary is not an extensive overview, and is not intended to identify key or critical elements or to delineate the scopes thereof. The sole purpose of the summary is to present selected concepts in a simplified form as a prelude to the more detailed description that is presented below.

The aspects described herein are systems, apparatus, methods and computer-readable storage media for facilitating messaging.

In one aspect, a computer-implemented method is provided. The computer-implemented method can include: receiving messaging content; and displaying the messaging content in a single thread, wherein the messaging content is threaded and a thread of the messaging content comprises at least one text message and at least one voice call.

In another aspect, a computer-implemented method is provided. The computer-implemented method can include: receiving messaging content; and displaying the messaging content in a single thread, wherein the messaging content is threaded in an order of the messaging content based, at least, on a perspective of a communication device at which the messaging content is received.

In yet another aspect, an apparatus is provided. The apparatus can include: a processor; a messaging component configured to: receive messaging content; thread the messaging content in a single thread, wherein the messaging content comprises at least one text message and at least one voice call; and display threaded messaging content; and a computer-readable storage medium storing computer-executable instructions that, if executed, cause the processor to perform one or more functions of the messaging component.

BRIEF DESCRIPTION OF THE DRAWINGS

Non-limiting and non-exhaustive embodiments of various aspects detailed herein are described with reference to the following figures, wherein like reference numerals refer to like parts.

DETAILED DESCRIPTION

Figure 1:
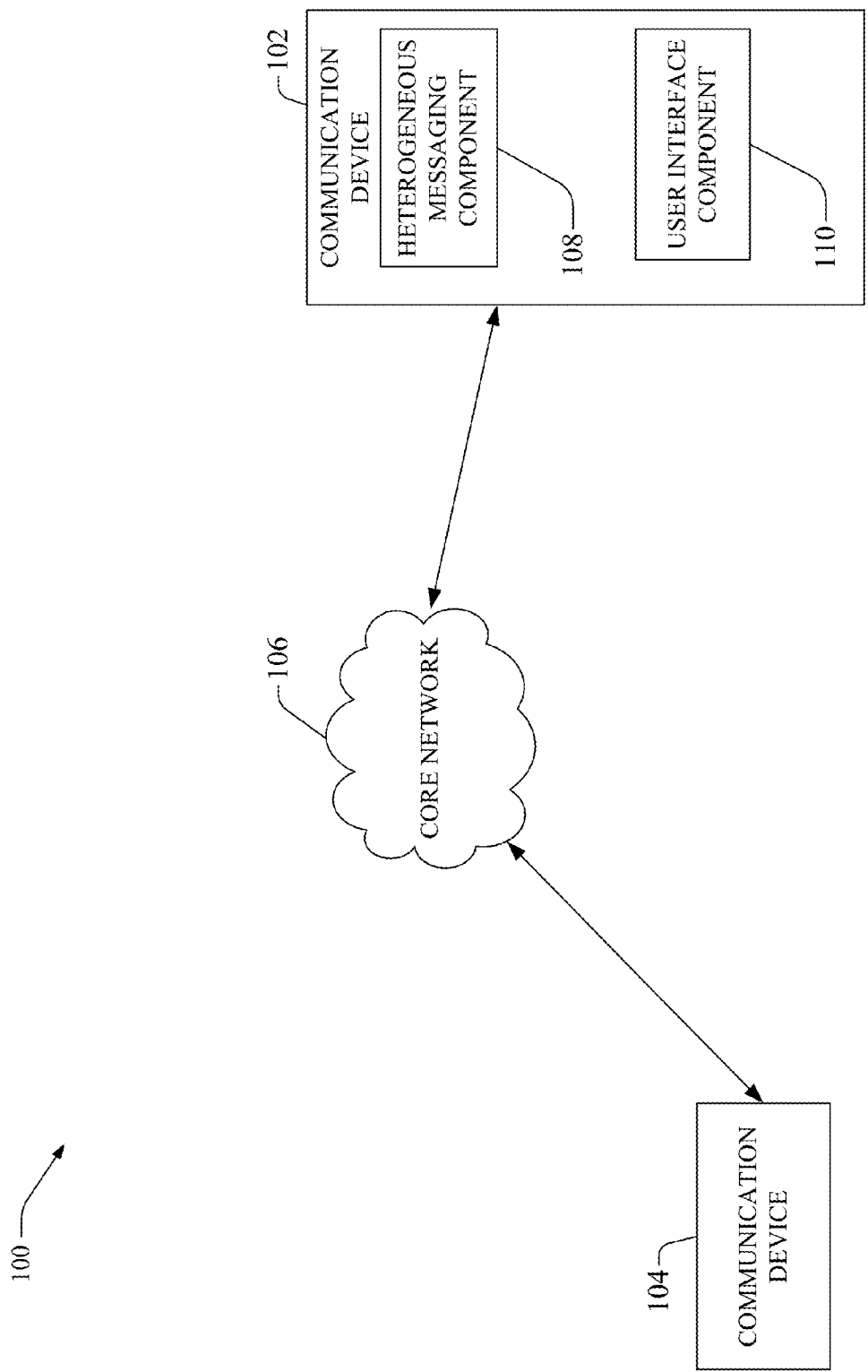
FIG. 1 illustrates a block diagram of an exemplary system for heterogeneous messaging in accordance with various aspects described herein.

Certain illustrative embodiments are described herein in the following description and the annexed drawings. These embodiments are merely exemplary, non-limiting and non-exhaustive. As such, all modifications, alterations, and variations within the spirit of the embodiments is envisaged and intended to be covered herein.

Further, in the following description, for purposes of mere explanation, numerous, specific details are set forth in order to facilitate a more thorough understanding of the embodiments described herein, including the claimed subject matter. However, as is known to those of ordinary skill in the art, the embodiments can be practiced, in many instances, without inclusion of the specific details.

As used in this application, the terms "component," "module," "system," "interface," and the like, are generally intended to refer to hardware and/or software or software in execution. For example, a component can be, but is not limited to being, a process running on a processor, a processor, an object, an executable, a thread of execution, a program and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application and/or application programming interface (API) components, and can be as simple as a command line or as complex as an Integrated Development Environment (IDE).

Furthermore, the embodiments can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), digital versatile disk (DVD)), smart cards, and/or flash memory devices (e.g., card, stick, key drive). Additionally it should be appreciated that a carrier wave can carry computer-readable electronic data (e.g., the data transmitted and received via email and/or to access the Internet or a network such as a local area network (LAN)). As known to those of ordinary skill in the art, modifications can be made to the above embodiments without departing from the spirit of the disclosure.

It will be appreciated by one of skill in the art that a communication network for systems described herein can include any suitable mobile- and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further examples of a communication network can include any suitable data packet-switched or combination data packet/circuit-switched communication network, wired or wireless internet protocol (IP) network such as a voice over internet protocol (VoIP) network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device for systems disclosed herein can include a mobile device, mobile phone, a PSTN phone, a cellular communication device, a cellular phone, a satellite communication device, a satellite phone, a VoIP phone, a wireless fidelity (WiFi) phone, a dual-mode cellular/WiFi phone, a combination cellular/VoIP/WiFi/Worldwide Interoperability for Microwave Access (WiMAX) phone or any suitable combination thereof. Specific examples of a mobile device can include, but is not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones UMTS VoIP phones, or like devices or combinations thereof. To provide support for a mobile device, a gateway routing component can include any suitable component that can perform centralized routing within a mobile, satellite, or similar network (but optionally need not include components that route strictly within a PSTN network), routing between communication networks, between networks of varying architecture (e.g., between PSTN, GSM, Universal Mobile Telecommunications System (UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such a system can include any suitable device, process and/or combination device and process that can store digital and/or switched information (e.g., server, data store component, data store component, or the like).

FIG. 1 illustrates a block diagram of an exemplary system that facilitates security of a communication device in accordance with various aspects and embodiments described herein. In an aspect, the system 100 can include communication devices 102, 104 and a core network 106. The communication devices 102, 104 can be communicatively coupled to the core network 106. In various embodiments, one or more of communication devices 102, 104 can include the software, hardware and/or have the functionality and/or structure (or portions thereof) of communication device 200 described herein (and vice versa).

In various embodiments, the core network 106 can include one or more of software, hardware and/or combination software and hardware configured to provide connectivity to and between the communication devices 102, 104. The system 100 can include one or more macro, Femto and/or pico access points (APs) (not shown), base stations (BS) (not shown) or landline networks (e.g., optical landline networks, electrical landline networks) (not shown) communicatively coupled between one or more of the communication devices 102, 104 and the core network 106 to provide connectivity between the communication devices 102, 104 and the core network 106. In various embodiments, the communication devices 102, 104 can communicate via any number of various types of wireless technologies including, but not limited to, cellular, WiFi, WiMax, wireless local area networks (WLAN), etc. In corresponding embodiments, the core network 106 can provide cellular, WiFi, WiMAX, WLAN and other technologies for facilitating such communication. The core network 106 can also include the Internet (or another communication network (e.g., IP-based network), a digital subscriber line (DSL)-type or broadband network facilitated by Ethernet or other technology. The core network 106 can also include, in various embodiments, servers including, email, multimedia, audio, video, news, financial or stock information servers.

The core network 106 can also include short message service (SMS) networks and multimedia message service (MMS) networks. The core network 106 can also include but is not limited to, routers, nodes, switches, interfaces, and/or controllers that can facilitate communication of data to or from the communication devices 102, 104. The core network 106 can transmit and receive voice, voicemail, system messages, text (e.g., MMS messages, SMS messages, email messages, instant messages), pictorial, video, audio, data traffic (e.g., user-opted notifications including, but not limited to, traffic reports, news alerts, weather information, stock reports), social networking chats, social networking posts, social networking status updates to and from the communication devices 102, 104. While only communication devices 102 and 104 are shown, in various embodiments, the core network 106 can include or can be communicatively coupled to other communication devices inside or outside of the network. In various embodiments, the network can also include hardware, software and/or a combination of hardware and software for allocating resources to the communication devices 102, 104, converting or enforcing protocols, establishing and/or providing levels of Quality of Service (QoS), applications or services in the network, translating signals, and/or performing other desired functions to facilitate system interoperability and communication to or from the communication devices 102, 104.

In various embodiments, the core network 106 can include or can be communicatively coupled to one or more of multimedia servers (not shown), email servers (not shown), data store components (not shown), Internet (not shown) for communicating one or more of text (e.g., MMS messages, SMS messages, email messages, instant messages), data, pictures, audio, multimedia, voice or video, voicemail, system messages, data traffic (e.g., user-opted notifications including, but not limited to, traffic reports, news alerts, weather information, stock reports), social networking chats, social networking posts and/or social networking status updates.

The core network 106 can also include data store components and/or memory storing information and/or computer-readable storage media storing computer-executable instructions enabling various operations by the communication devices 102, 104. In some embodiments, the core network 106 can include data store components and/or memory storing computer-executable instructions and/or settings for providing heterogeneous messaging to, from or within the communication devices 102, 104. In some embodiments, a data store component can store settings, and/or memory can store computer-executable instructions, enabling the communication device 104 to operate according to heterogeneous messaging protocols as described in greater detail herein.

In some embodiments, the network 106 can include rules and/or policies for heterogeneous messaging in accordance with embodiments disclosed herein. In some embodiments, heterogeneous messaging can include threading heterogeneous messaging content. Messaging content can include, but is not limited to, SMS messages, MMS messages, email messages, voice calls, video calls, voicemail messages and any other type of data or voice traffic that can be transmitted from or received at the communication devices 102, 104. For example, system messages, text (e.g., MMS messages, SMS messages, email messages, instant messages), pictorial, video, audio, data traffic (e.g., user-opted notifications including, but not limited to, traffic reports, news alerts, weather information, stock reports), social networking chats, social networking posts, social networking status updates can also be transmitted from or received at the communication devices 102, 104.

In various embodiments, heterogeneous messaging can include ordering messaging content according to the time that the messaging content is received by the recipient of the messaging content. The most recently received messaging content can be displayed at the bottom of the thread of threaded messaging content in some embodiments. Ordering based on sent time could result in messages and/or voice calls being listed out of order, hidden off the screen of the communication device, and/or cause difficultly for the user to follow the history of the conversation thread. As such, ordering message from a recipient-centric perspective is desired.

In various embodiments, the communication devices 102, 104 can be mobile, wireless, wireline and/or optical devices. The communication devices 102, 104 can include, but are not limited to, a mobile or cellular telephone including, but not limited to, a smartphone, BLUETOOTH® device, a 3GPP UMTS phone, a personal digital assistant (PDA), computer, IP television (IPTV), wireline phone with mobile messaging functionality, gaming console, a set top box (STB), a multi-media recorder, a multi-media player, a video recorder, a video player, an audio recorder, an audio player, laptop, a printer, a copier and/or a scanner.

In various embodiments, the communication devices 102, 104 can include hardware, software or a combination of hardware and software facilitating operation according to one or more communication protocols described above with reference to the core network 106, or the functionality facilitated by the hardware, software or combination hardware and software described above with reference to the core network 106. The communication protocols and/or functionality can include, but is not limited to, MMS, SMS, WLAN, WiFi, WiMAX, BLUETOOTH® protocol, text messaging, electronic mail messaging, facsimile, multimedia and/or any number of other protocols or functionalities as described above with reference to the communications protocols or functionalities facilitated by core network 106. In various embodiments, the communication devices 102, 104 can transmit and/or receive voice, text, pictorial, video, audio and/or data traffic to and from the communication devices 102, 104.

In some embodiments, the communication devices 102, 104 can include hardware, software and/or a combination of hardware and software to facilitate providing heterogeneous messaging, from, to or within the communication devices 102, 104 as described herein. For example, in various embodiments, as shown at communication device 102, the communication devices 102, 104 can include a heterogeneous messaging component 108 and a UI component 110 for heterogeneous messaging at the communication device 102. In various embodiments, the UI component 110 can facilitate receiving or outputting information for providing or enabling the one or more heterogeneous messaging functions or protocols, providing or enabling communication to or from the communication device 102, accessing information stored within, or storing information within, the communication device 102, or any controlling the communication device 102, or receiving information output from the communication device 102, via the UI component 110.

While heterogeneous messaging methods and communication devices facilitating such are described below with reference communication device 200, in various embodiments, the communication device 200 can be or include one or more of the functions or structure (or portions thereof) of communication device 102, 104 (and vice versa).

Figure 2:
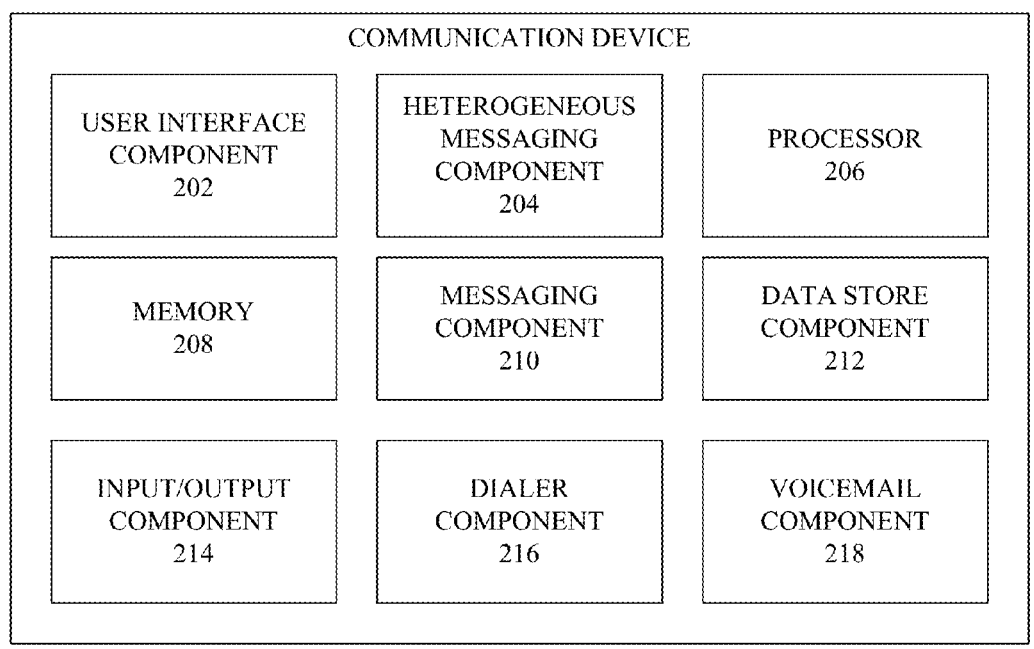
FIG. 2 illustrates a block diagram of an exemplary communication device in which heterogeneous messaging can be provided in accordance with various aspects described herein.

Turning now to FIG. 2, FIG. 2 illustrates a block diagram of a communication device that facilitates security in accordance with various aspects and embodiments described herein. The communication device 200 can include a UI component 202, a heterogeneous messaging component 204, a processor 206, a memory 208 and an input/output (I/O) component 214. In various embodiments, the communication device 200 can also include a messaging component 210, a data store component 212, a dialer component 216 and/or a voicemail component 218. In some embodiments, the heterogeneous messaging component 204 can include or be operably coupled to a threading component (not shown). In some embodiments, the UI component 202 can include or be operably coupled to a thread UI component (not shown). One or more of the components can be communicatively coupled to one another to perform the functions of the communication device 200 described herein.

Referring first to the I/O component 214, the I/O component 214 can include hardware, software and/or a combination of hardware and software facilitating receipt and output of messaging content to and from the communication device 200 and/or detection of threading information when threading of the messaging content is performed at a location outside of the communication device 200. The receipt and transmission of messaging content and/or threading information can be utilized to provide heterogeneous messaging at the communication device 200.

Turning now to the UI component 202, the UI component 202 can include hardware, software and/or a combination of hardware and software facilitating display of information from the communication device. In various embodiments, the UI component 202 can facilitate display of one or more conversations. In some embodiments, the conversations can include messaging content that is heterogeneous (e.g., voice content and SMS, MMS and/or email messages, instant messages, voicemail, system messages, pictorial, video, audio, data traffic (e.g., user-opted notifications including, but not limited to, traffic reports, news alerts, weather information, stock reports), social networking chats, social networking posts, social networking status update messages). The UI component 202 can be configured to control the UI to display the messaging content in a single thread at the communication device 200.

In some embodiments, while the communication device 200 and/or the UI for the communication device 200 is locked (or, in some embodiments, unlocked), the UI component 202 can be configured to display one or more pop-up screens and/or display regions overlaying display regions provided prior to receipt of notification of threaded messaging content.

The UI can be any number of different types of UIs including, but not limited to, a graphical user interface (GUI), a touch-sensitive interface (e.g., a touch screen), an interface having capability for receiving audio input (and outputting audio information) and the like. In some embodiments described herein, the UI can include a touch screen configured to receive inputs at the touch screen and graphically output information for heterogeneous messaging from the touch screen. The UI can be enabled to display alpha and/or numeric characters, message balloons, images, icons and the like for heterogeneous messaging. For example, the UI can display the display regions described in more detail below, and shown at FIGS. 5A and 5B.

Turning now to the heterogeneous messaging component 204, the heterogeneous messaging component 204 can include software, hardware and/or a combination of hardware and software for providing heterogeneous message to, from or within the communication device 200. In some embodiments, processing for the heterogeneous messaging can be initiated upon receiving the messaging content at the heterogeneous messaging component 204.

The heterogeneous messaging protocol can be implemented in conjunction with execution of a heterogeneous messaging application in some embodiments. The heterogeneous messaging application can be stored on or accessible to the communication device 200 in various embodiments.

The communication device 200 can include a memory 208 and data store component 212. The memory 208 and/or data store component 212 can store information and/or settings and/or computer-executable instructions for performing one or more functions described herein for the communication device 200. In various embodiments, as described below with reference to method 300 of FIG. 3, the data store component 212 can be a conversations data store component that can store information including, but not limited to, received messaging content, timestamp information, timestamps, messaging content details, conversation IDs and the like.

In various embodiments, the data store component 212 can store data structures (e.g., user data, application data, metadata); code structure(s) (e.g., modules, objects, classes, procedures) or instructions; message hashes; neighbor cell list; information relating to securing the communication device 200 and information associated therewith, displaying information in the UI display screen, generating or displaying an overlay display region, generating or processing notifications and associated notification-related information; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor 206 can be functionally coupled (e.g., through a memory bus) to the data store component 212 in order to store and retrieve information (e.g., neighbor cell list; information relating to securing the communication device 200 and information associated therewith, displaying information in the UI display screen, generating or displaying an overlay display region, generating or processing notifications and associated notification-related information; frequency offsets; desired algorithms; etc.) desired to operate and/or confer functionality, at least in part, to, heterogeneous messaging component 204, UI component 202, and/or other operational aspects or components of the communication device 200.

In various embodiments, the heterogeneous messaging component 204 can implement one or more heterogeneous messaging protocols as described herein with reference to methods 300, 400 and/or display regions 500, 500'.

Figure 3:
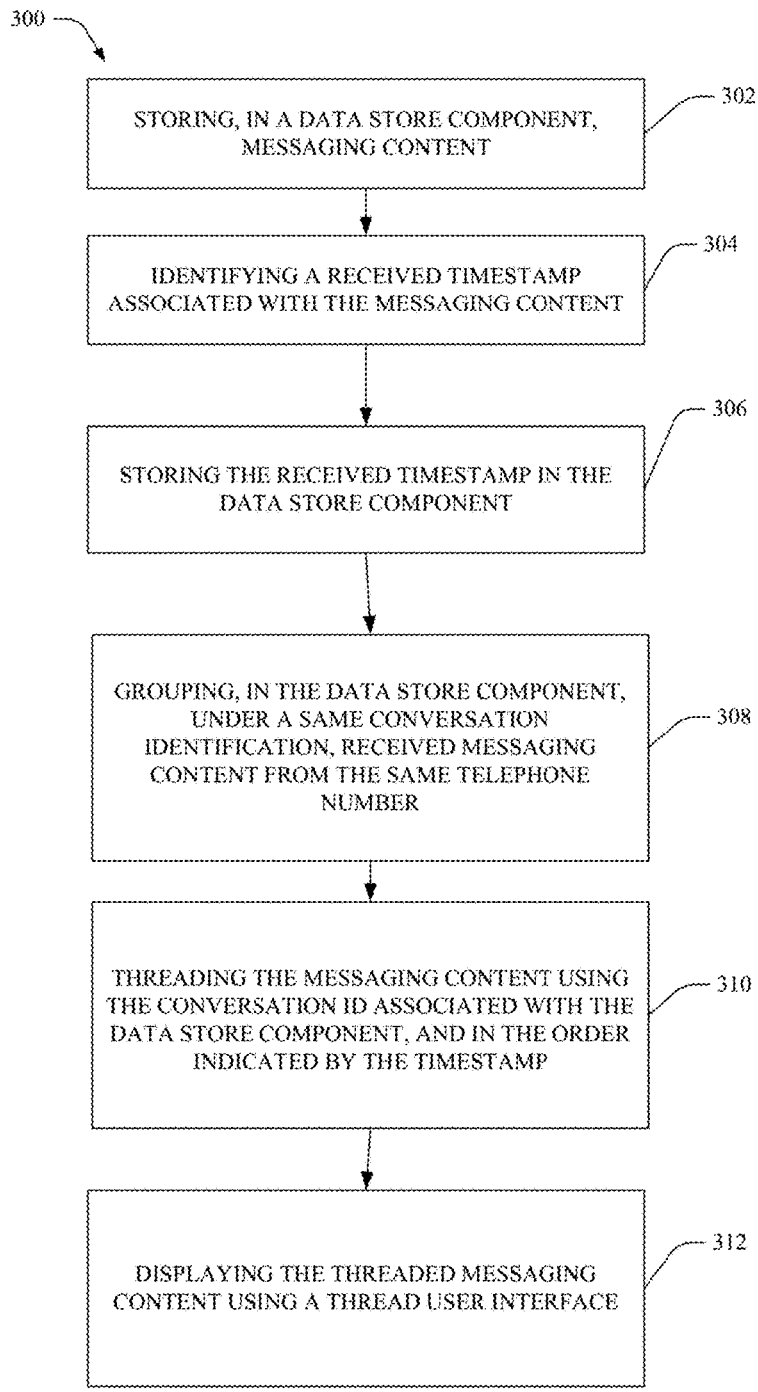
FIGS. 3 and 4 illustrate flowcharts of exemplary methods for heterogeneous messaging at a communication device in accordance with aspects described herein.
Figure 4:
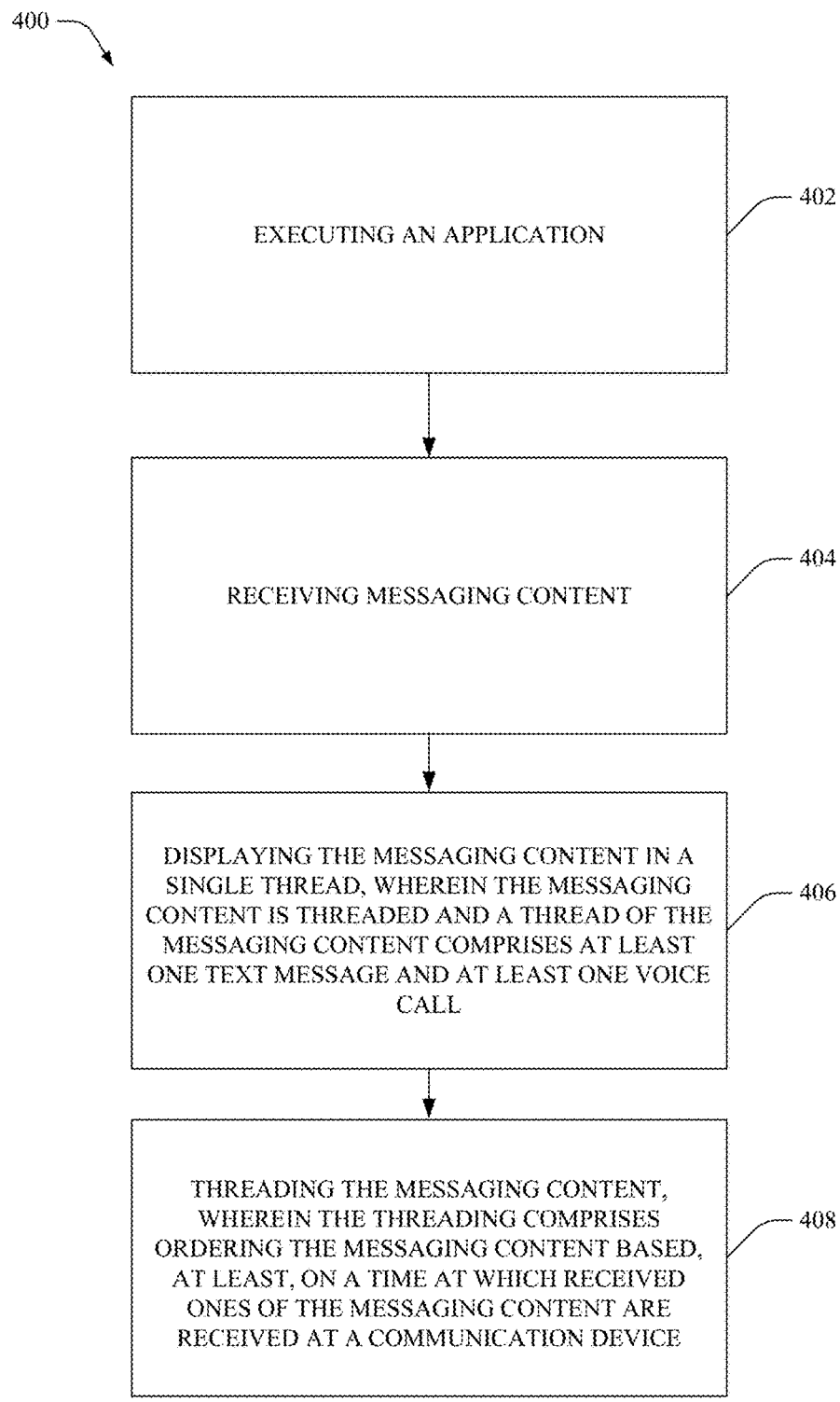

Turning first to methods 300, 400, FIGS. 3 and 4 illustrate flowcharts of exemplary methods for heterogeneous messaging at a communication device in accordance with various aspects and embodiments described herein. In various embodiments, heterogeneous messaging can be controlled and/or implemented by the heterogeneous messaging component 204 described with reference to FIG. 2.

Method 300 can include, at step 302, storing, in a data store component (such as data store component 212 of FIG. 2), messaging content received at the communication device. In some embodiments, the data store component can be database. In various embodiments, the data store component 212 and/or database can be located remote from the communication device 200 and merely communicatively coupled to the communication device 200.

Referring to FIGS. 2 and 3, in some embodiments, the communication device 200 can also include a dialer component 216 and/or a voicemail component 218, each of which can be employed for performing the method 300. In various embodiments, when a message is received, the method can include receiving an incoming SMS notification or MMS notification provided to the messaging component 210 of the communication device 200. In various embodiments, when a call is received, the method can include receiving an incoming call notification at a dialer component 216 and the dialer component 216 providing information to the conversation application with information regard to the call details. In some embodiments, the dialer component 216 can include a dialer application for performing one or more of the functions of the dialer component 216. The information provided to the conversation application can include, but is not limited to, timestamp information re the time that the call was received, the sender of the call, the telephone number associated with the call and/or city and state from which the call originated. For example, for mobile terminated (MT) calls and mobile originated (MO) calls, the information (e.g., telephone number, timestamp) is provided by the dialer component 216 to the conversations application.

In some embodiments, the information provided to the conversation application from the dialer component 216 can be a universal resource locator (URL). As such, received messages are differentiated from received calls through the application receiving and processing the different messaging content.

In some embodiments, the dialer component 216 can provide information to a voicemail component 218 configured to process voicemails associated with calls received at the communication device 200. For example, the voicemail component 218 can include a voicemail platform for processing and/or creating and/or storing voicemails (or information associated with the voicemail) and/or associating a timestamp with the voicemail. The voicemail component 218 can provide such information to the conversations application.

At 304, method 300 can include identifying and/or generating a timestamp associated with the messaging content. For SMS messages, a timestamp is generated by the conversations application at the time of receipt at the communication device. For MMS messages, a timestamp is generated at the time of receipt at the communication device and provided to the conversations application. For calls, the timestamp is provided by call notification data to the dialer component and the dialer component can forward the same timestamp to the conversations application.

At 306, method 300 can include storing the received timestamp in a data store component. At 308, method 300 can include grouping under the same conversation identification (ID), of the data store component or database, messaging content details and/or other information associated with the messaging content. In some embodiments, the messaging content is for a conversation and the received messaging content is from the same telephone number.

At 310, method 300 can include threading the messaging content (e.g., calls and/or messages) associated with the same conversation ID, and/or in the order indicated by the timestamp. Threading can be grouping messages together in parent/child relationships based on which messages are replies to which other messages.

Data store component queries can be provided to fetch the messaging content entries in the data store component for a single conversation thread in sorted order based on the received time at the communication device. SQLite queries can be used to perform fetching and can perform the sorting based on the information retrieved. The messaging content from a same telephone number (including calls and messages) are then sorted and displayed in the thread based on received time.

At 312, method 300 can include displaying the sorted messaging content using a thread UI (not shown in FIG. 2). The sorted messages can be displayed via the communication device. The list of messages and calls associated with the conversation ID can be provided to the UI for display of the conversation. In various embodiments, a backend module associated with the conversations application can provide the sorted list of messaging content for a thread. As such, the UI can display the messaging content in the UI in the sorted order. The most recent messaging content can be displayed at the bottom of the thread in some embodiments.

Method 400 is another method of heterogeneous messaging. The method 400 can include executing an application at 402. In some embodiments, the application includes a messaging application and a display application. In some embodiments, the method 400 executes a single application and begins with step 404.

At 404, method 400 can include receiving messaging content. in some embodiments, the messaging content can be received via messaging application.

At 406, method 400 can include displaying the messaging content in a single thread, wherein the messaging content is threaded and a thread of the messaging content comprises at least one message and at least one voice call.

At 408, method 400 can include executing a threading application, and threading the messaging content, via the threading application. The threading can comprise ordering the messaging content based, at least, on a time at which received ones of the messaging content are received at a communication device. In some embodiments, prior to the ordering the messaging content, the method can include determining (not shown) the time at which received ones of the messaging content are received at the communication device, and associating (not shown) timestamps with the received ones of the messaging content and with sent ones of the messaging content.

In some embodiments, method 400 can include displaying (not shown), via a user interface controlled by the display application, threaded messaging content. Displaying the threaded messaging content can include displaying sent ones of the threaded messaging content in a first region of a screen of the communication device, and displaying received ones of the threaded messaging content in a second region of the screen of the communication device. For example, with reference to FIG. 5A, sent messages can be on a left portion of the display region of the UI and received messages can be on a right portion of the display region. In other embodiments, the sent and received messages can be provided on a top or bottom portion of the display region.

Another method (not shown) can include: executing a messaging application and a display application; receiving, via the messaging application, messaging content; and displaying the messaging content in a single thread, wherein the messaging content is threaded in an order of the messaging content based, at least, on a perspective of a communication device at which the messaging content is received. The method can also include, in some embodiments, ordering the messaging content.

Ordering can be based, at least, on the perspective of the communication device at which the messaging content is received, wherein ordering based on such perspective includes ordering based, at least, on a time at which received ones of the messaging content are received at a communication device.

In some embodiments, prior to the ordering the messaging content, the method can include determining (not shown) a time at which received ones of the messaging content are received at the communication device, and associating (not shown) timestamps with the received ones of the messaging content and with sent ones of the messaging content.

In some embodiments, the method can also include displaying, via a UI controlled by the display application, threaded messaging content. Displaying the threaded messaging content can include displaying sent ones of the threaded messaging content in a first region of a screen of the communication device, and displaying received ones of the threaded messaging content in a second region of the screen of the communication device.

Figure 5A:
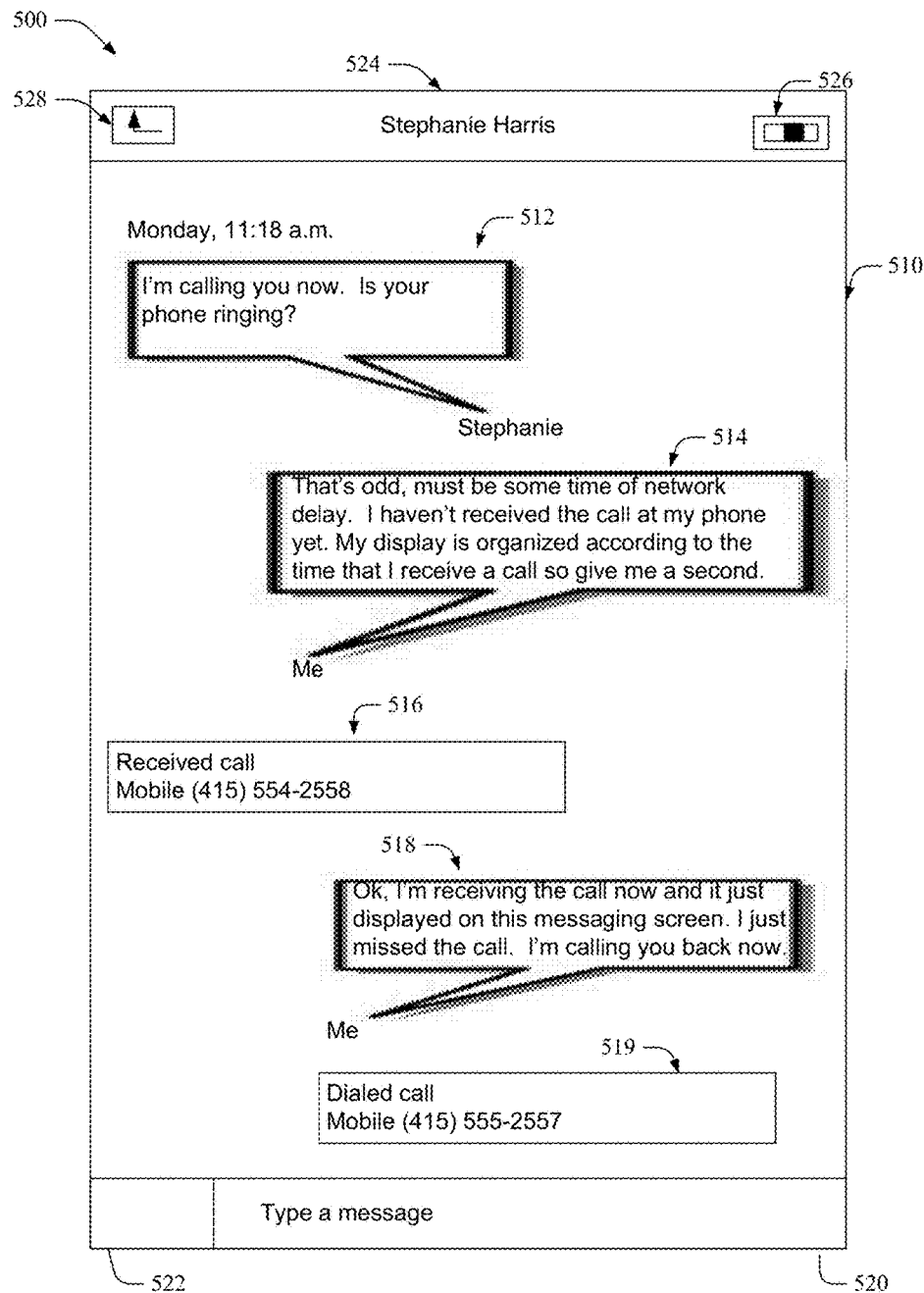
FIGS. 5A and 5B illustrate display regions of user interfaces of communication devices providing heterogeneous messaging device in accordance with aspects described herein.

FIG. 5A illustrates a block diagram of a display region of a UI providing a messaging screen that facilitates threaded messaging for a selected entity in accordance with aspects described herein. The threaded messaging can be a conversation, which can include one or more telephone calls (e.g., voice calls, video calls), MMS messages, email messages, instant messages and/or SMS messages grouped by common recipients. Each conversation has a unique set of recipients. In various embodiments, the conversation can also include, but is not limited to, voicemail, system messages, text, pictorial, audio, data traffic (e.g., user-opted notifications including, but not limited to, traffic reports, news alerts, weather information, stock reports), social networking chats, social networking posts and/or social networking status updates.

In various embodiments, the recipient and transmission mode can be one-to-one, group or broadcast conversations mode. The group and broadcast conversation modes can be enabled and recipients selected by selection such options and recipients on the communication device.

In one-to-one conversation mode, a message is transmitted to one recipient. As noted, a message can include, but is not limited to, telephone calls (e.g., voice calls, video calls), MMS messages, email messages, instant messages and/or SMS messages, voicemail, system messages, text, pictorial, audio, data traffic (e.g., user-opted notifications including, but not limited to, traffic reports, news alerts, weather information, stock reports), social networking chats, social networking posts and/or social networking status updates. The one-to-one conversation mode employs SMS transmission unless media is attached to the message, in which case an MMS message is used.

In broadcast conversation mode, a message and/or voice call is transmitted to more than one recipient. Each recipient views only the sender's messages and/or voice calls. In the absence of media, messages are transmitted over SMS.

In group conversation mode, a message is transmitted between two or more recipients and a sender, with all recipients seeing all messages to and from other recipients. Regardless of whether media is attached, all messages are transmitted over MMS with addresses populating the cc field. In a group conversation, the conversation can illustrate messages and/or calls threaded for a group of recipients. The recipients can be noted on the communication device screen and any message or call sent or received from or to anyone in the group is shown in the conversation.

Each message can represent a call, an SMS message or an MMS message. In the case of a call, the Message has can have no message components because the message can be represented in a message object. In the case of an SMS, there can be a single message component holding the text of the message. In the case of an MMS, there can be any number of message components, each representing either text or a supported media type including, but not limited to, a picture, audio file or the like. The recipient can be the user sending or receiving a call, SMS or MMS. The recipient's information can be linked with the recipient's contact data if an entry for the recipient exists in the contacts information on the communication device or is accessible by the communication device.

The messaging screen 500 can provide a display area 510. The display area 510 can display messaging content 512, 514, 516, 518 to or from an individual or group, indicia 524 identifying the individual or group, a button 528 for displaying one or more conversations, a button 526 for indicating whether a contacts or social media screen or conversation screen when the UI is a triptych UI, as described in U.S. Non-Provisional patent application Ser. No. 12/645,726, filed Dec. 21, 2009, titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY," which is incorporated herein by reference in its entirety.

The messaging content 512, 514, 516, 518, 519 can compose the conversation history displayed in the display area 510. The conversation history can be a chronological history of sent and received messaging content. The sent and received messaging content can include sent and/or received telephone (or video) calls and text or other non-telephone call messages. The most recent event or messaging content can appear at the bottom of the list. If more than a predetermined number of events or messaging content is displayed, only the most recent number is displayed. In some embodiments, the predetermined number of events or messaging content is 25 events or messaging content displays.

In some embodiments, if the conversation includes more than one unread event (e.g., unread messaging content), the list can be position at the top of the oldest unread object. However, in some embodiments wherein the UI is a triptych UI, if the triptych UI is navigated from the messaging screen to the social media or contacts screen, and then back to the messaging screen, the position of the conversation list is displayed to be the same position of the conversation list prior to navigating to the social media or contacts screen. In other embodiments, the list position is preserved after a call detail or message detail overlay is displayed on the UI. The call detail or message detail can be information about a telephone call or other messaging content in the conversation list. The call detail and message detail can include such as the author of the messaging content, the duration of a call, the time of a call or other messaging content received by the recipient and/or any error notifications re the call or other messaging content. In some embodiments, the communication device 200 can display the call detail or other messaging content detail when the communication device 200 detects that the call or other messaging content has been selected (e.g., depressed, activated) for a predetermined amount of time.

In some embodiments, the list position is not preserved for messaging content taller than the height of the area in which the conversation history is displayed. In these cases, the position of the list defaults to the top of the messaging content.

In some embodiments, the indicia 524 identifying the individual or group can be a contact name stored in the contacts of the communication device 200.

In various embodiments, the messaging content can be provided in bubbles or other visual indicia of the individual or groups that transmitted the messaging content 512, 514, 516, 518, 519. The messaging content 512, 514, 516, 518, 519 can be organized in chronological order, by the time at which the content was received at the communication device 200. When messaging content 512, 514, 516, 518, 519 is sent from the communication device 200, such as messaging content 519, the messaging content 519 can be ordered according to the time that it was sent from the communication device. Thus, the ordering and display of messaging content can be user-centric by being based on the perspective of the user viewing the messaging content.

Figure 5B:
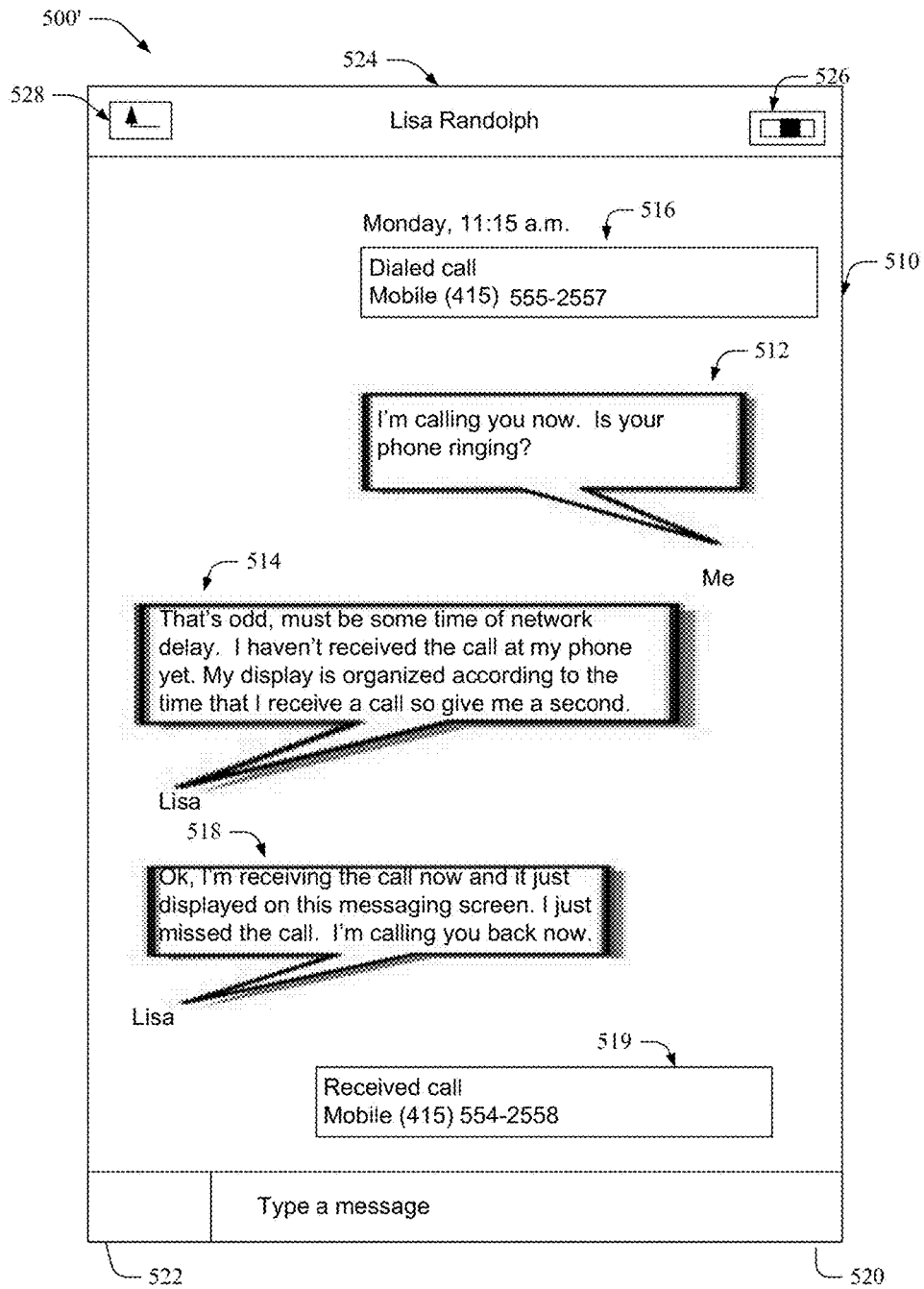

Similarly, as shown in FIG. 5B, the display of the messaging content at the communication device 200' that sent the messaging content 516 is ordered according to the perspective of the communication device that sent the messaging content 516. As such, the messaging content 516 appears earlier than the messaging content 512, 514 because the messaging content 516 is ordered according to the perspective of the communication device 200'. The ordering can be as shown in FIG. 5B.

As shown in FIG. 5B, because the messaging content 516 was sent from the communication device 200 prior to sending messaging content 512, the messaging content 516 is displayed above the displayed content 512. Similarly, the messaging content 519 was received by the communication device 200' after receiving the messaging content 518, so the messaging content 519 is displayed after the messaging content 518. In general, the system can be configured to display for each communication device, a user-centric ordering of heterogeneous (or homogeneous) messaging content such that messaging content sent from a communication device is displayed on a communication device in an order according the time that the messaging content was sent from the communication device, and such that messaging content received at the communication device is displayed on the communication device in an order according to the time that the messaging content was received at the communication device.

As such, referring back to FIG. 5A, because messaging content 516 was not received by the communication device 200 until after the messaging content 512 had been received by the communication device 200', the messaging content 516 on communication device 200 is shown below the messaging content 512. Similarly, referring to FIG. 5B, because messaging content 516 was sent from communication device 104 before messaging content 512 was sent from communication device 104, the messaging content 516 on communication device 104 is shown above the messaging content 512.

Referring back to FIG. 5A, in some embodiments, the display area 510 can also include time information in the form of a timestamp or any other manner for indicating a time that messaging content was received. The time information can be displayed when a predetermined amount of time has passed since the last event or messaging content. When such occurs, the next event or messaging content can be displayed in association with time information for the call or other messaging content.

Time information can also be displayed and/or associated with a message based on a 12-hour clock in the format [HH]:[MM] [am or pm] (e.g., 1:00 pm), or based on a 24-hour clock in the format [HH]:[MM] (e.g., 13:00).

In various embodiments, the time information can be displayed and/or associated with a message, in a short format or a long format and, for each format, based on the time or date associated with the messaging content. For example, for short format or long format, time information for messaging content associated with the current day can include 12-hour or 24-hour format time information.

In long format, time information for messaging content associated with a day prior to the current day can include the 12-hour or 24-hour format time and other indicia such as, but not limited to, the day, month and/or year of the messaging content.

By way of example, but not limitation, for long format, time information can be as follows. Time information for messaging content associated with the previous day can be any indicia indicating that the messaging content is associated with a previous day) along with the 12-hour or 24-hour format of the time associated with the messaging content (e.g., "Yesterday 2:42 pm"). Time information for messaging content more than one day prior to the current day and less than one week prior to the current day can be indicated as the day of the week along with the 12-hour or 24-hour format of the time associated with the messaging content (e.g., "Sunday 2:42 pm"). Time information for messaging content more than one week prior to the current day and in the same year as the current day can be indicated as the day, month and date associated with the messaging content along with the 12-hour or 24-hour format of the time associated with the messaging content (e.g., "Fri, Jun 11 2:42 pm"). In some embodiments, the date can be indicated using alpha characters along with the 12-hour or 24-hour format of the time associated with the messaging content (e.g., "Fri, Jun Eleventh 2:42 pm"). Time information for messaging content more than one week prior to the current day and in another year as the current day can be indicated as the month, date and year associated with the messaging content along with the 12-hour or 24-hour format of the time associated with the messaging content (e.g., "Jun 11, 08 2:42 pm"). In some embodiments, one or more of the month and/or year can be truncated. In some embodiments, one or more of the day and month can be truncated. In some embodiments, the date and/or year can be indicated using alpha characters. For example, the date can be indicated as "Eleventh" instead of "11".

By contrast, in short format, time information for messaging content associated with a day prior to the current day can include indicia such as, but not limited to, the day, month and/or year of the messaging content in lieu of also including the 12-hour or 24-hour format.

By way of example, but not limitation, for short format, time information can be as follows. Time information for messaging content associated with the previous day can be any other indicia indicating that the messaging content is associated with a previous day (e.g., "Yesterday"). Time information for messaging content more than one day prior to the current day and less than one week prior to the current day can be indicated as the day of the week (e.g., "Sunday"). Time information for messaging content more than one week prior to the current day and in the same year as the current day can be indicated as the day, month and date associated with the messaging content (e.g., "Fri, Jun 11"). In some embodiments, one or more of the day and month can be truncated. In some embodiments, the date can be indicated using alpha characters (e.g., "Fri, Jun Eleventh"). Time information for messaging content more than one week prior to the current day and in another year as the current day can be indicated as the month, date and year associated with the messaging content (e.g., "Jun 11, 08"). In some embodiments, one or more of the month and/or year can be truncated. In some embodiments, one or more of the day and month can be truncated. In some embodiments, the date and/or year can be indicated using alpha characters. For example, the date can be indicated as "Eleventh" instead of "11".

In some embodiments, time information is displayed associated with the messaging content when a predetermined amount of time since the receipt or sending of an event or messaging content has elapsed. In some embodiments, the predetermined amount of time is 20 minutes.

The messaging content 512, 514, 516, 518, 519 can include, but is not limited to, textual, graphical, video and/or pictorial information. The messaging content can be indicative of a telephone call (such as that shown at 516, 519), a text message (such as that shown at 512, 514, 518), an email message, a picture message or otherwise. Additionally, the messaging content can include audio files and/or links to websites or audio files. As shown in FIGS. 5A and 5B, the type of messaging content is heterogeneously composed of different types of messages displayed in the display area 510. As such, different types of messages, including but not limited to, indicia indicating incoming, ongoing or missed telephone calls, can be displayed with text messages, email messages, picture messages, web site links, and the like.

As shown in FIGS. 5A and 5B, while the sender can make a telephone call to the communication device 200 at a selected time, as described at message 512, the messaging content 512, 514, 516, 518, 519 is ordered in the display region 510 based on the time that the communication device receives the messaging content, as compared to the ordering and displaying the messaging content 512, 514, 516, 518, 519 based on the time that the sender sends the message. As such, the system can account for network delay between the sender and the recipient, and display a received telephone call (shown as messaging content 516), for example, based on the time that the call is received by the communication device 200.

As such, the system can provide continuity of display of messaging content 512, 514, 516, 518, 519 based on the perspective of the recipient, as opposed to the sender, to facilitate threading telephone calls into the conversation thread. Due to the real-time nature of telephone calls, because the system threads telephone call messaging content with other messaging content, and telephone calls are presumed to be provided in real-time, and is typically handled as real-time data, ordering messaging content with a recipient-based approach is uniquely tied to the type of data (i.e., calls) being included in the thread.

With systems that thread only non-real-time data (e.g., text messages, email messages), ordering messages based on the time that the sender sent the message (instead of ordering based on the time that the recipient received the message) can be provided and easily used by the user. It would not be obvious to adapt sender-based systems to recipient-based systems because the nature of the data previously transmitted (non-real-time data) would reduce the need for a recipient receipt based approach because the received time is not critical.

The display region 510 can also include a text box 520 for entering text to send to another user, and a button 522 or region of the display region 510 that can be depressed or otherwise activated to send the message after the message has been typed into text box 520.

In some embodiments, the display region 510 can display sent and received messages between the user of the communication device 200 and a contact (or entity representing a plurality of people, such as an organization, or the like). In some embodiments, the sent messaging content can be displayed on one side of the display area 510 and the received messaging content can be displayed on the other side of the display area 510. In one embodiment, received messaging content is displayed on the left side of the display area 510 and sent messaging content is displayed on the right side of the display area 510.

While the embodiments described herein are described with reference to a combination of two or more components, in various embodiments, one or more of the functions or structure (or part thereof) associated with the two or more components of the communication devices 102, 200 can be performed or provided in the heterogeneous messaging component 204, respectively. Additionally, steps associated with various methods described herein that can be described with reference to different components or applications can be performed by a single component or application. Finally, multiple steps can be combined and performed in a single step, single steps can be performed as multiple steps, and steps described as being performed in sequence or parallel can be performed partly or completely in parallel or sequence, respectively.

While threading has been described with regard to threading being displayed while the communication device 200 is displaying conversations and/or messaging generally, in various embodiments, threading can be performed and displayed while the communication device 200 and/or UI is locked. Communication devices and/or UIs can be locked based on any number of different protocols including, but not limited to, the security protocols described in U.S. Non-Provisional patent application Ser. No. 12/902,979, filed Oct. 12, 2010, titled "LOCKING AND UNLOCKING OF AN ELECTRONIC DEVICE USING A SLOPED LOCK TRACK, U.S. Non-Provisional patent application Ser. No. 12/643,726, filed Dec. 21, 2009, titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY, the entire contents of each of which are incorporated herein by reference.

In various embodiments, while the communication device and/or UI is locked, threading of messaging content (e.g., voice, voicemail, system messages, text (e.g., MMS messages, SMS messages, email messages, instant messages), pictorial, video, audio, data traffic (e.g., user-opted notifications including, but not limited to, traffic reports, news alerts, weather information, stock reports), social networking chats, social networking posts and/or social networking status updates) can be performed. One or more portions of the threaded content can be displayed.

Figure 6A:
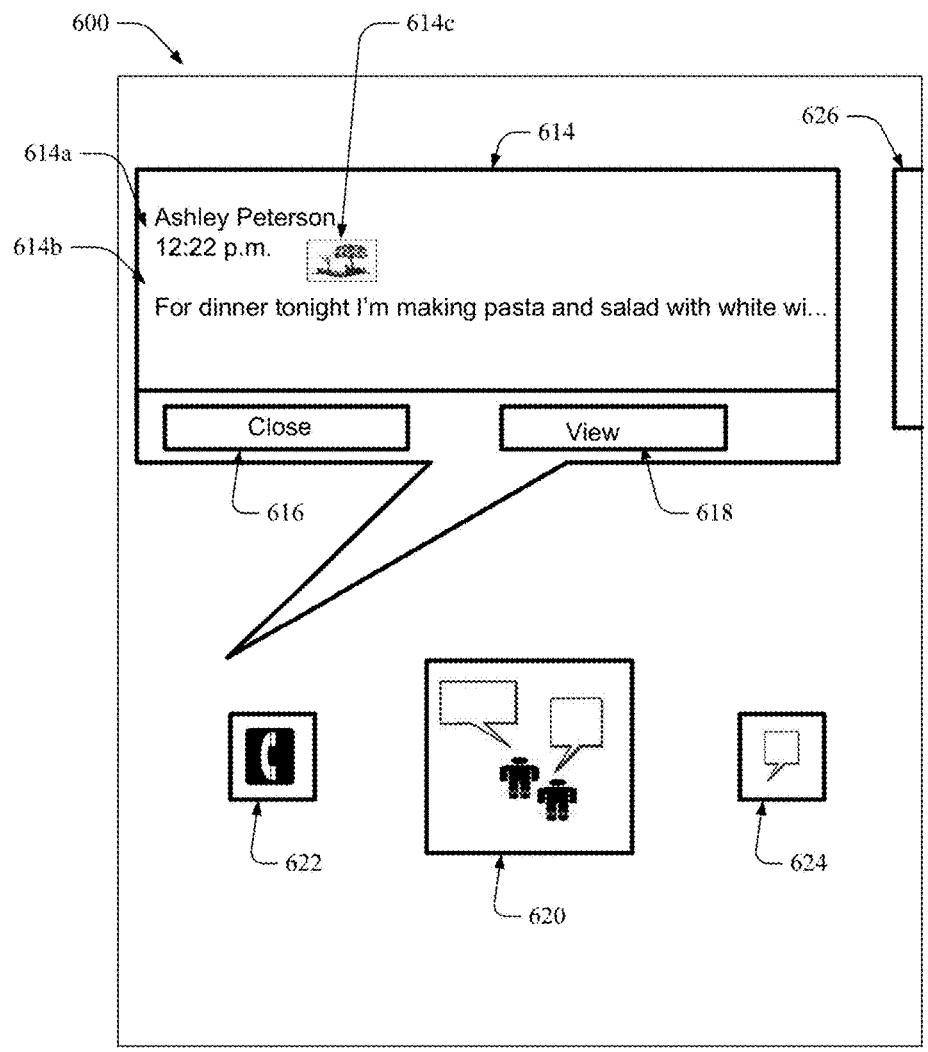
FIGS. 6A, 6B, 6C, 6D and 6E illustrate display regions of user interfaces of locked communication devices providing heterogeneous messaging device in accordance with aspects described herein.

For example, as shown in FIG. 6A, a display region 600 of a UI can be displayed outputting information 614, 626 indicative of threaded content. In some embodiments, while the communication device 200 is locked, the display region 600 can be provided as a pop-up screen overlaying one or more portions of a screen of the communication device 200 that is displayed prior to the display of the pop-up screen.

As shown in FIG. 6A, messaging content 614 can be threaded with messaging content 626, which can be the next messaging content in the thread, in some embodiments. As such, the threading can be displayed in a horizontal fashion as shown. The most recent messaging content can be displayed in display region 600 while the next messaging content 626 in the thread can be partially displayed in the display region 600 in some embodiments. In some embodiments, swiping left and right can display the threaded messaging content in chronological order of receipt at the communication device.

By way of mere example, but not limitation, messaging content 614 can include messaging details 614a indicative of the sender of the message and the time that the message was received at the recipient. The messaging content 614 can also include a message (or portion thereof) 614b and/or media 614c associated with the messaging content 614. The icon 614c can change in appearance based on the type of media attached to the messaging content 614.

The display region 600 can also display buttons or icons 616, 618 that can be activated by a user of the communication device 200 to close the notification of the messaging content and/or to close the pop-up screen, or to view the entirety of the messaging content. While the messaging content 614 is displayed with only a portion of the message showing, in some embodiments, as shown in FIG. 6D, the sender's name and/or any other information included in the messaging content can be abbreviated. Thus, the button or icon 618 can be activated to display the entirety of such abbreviated information.

As also shown in FIG. 6A, the display region 600 can display icons 622, 620, 624 indicative of the type of information displayed in the notification. For example, in the embodiment shown, a threaded messaging icon 620 can appear in an enlarged fashion relative to the other icons 622, 624 to indicate that the notification displays information about threaded messaging.

In various embodiments, the UI component 202 can control the display region 600 and/or the pop-up screen displaying the display region 600 to disappear after a pre-defined amount of time of no receipt of inputs from the user to the display region 600. By way of example, but not limitation, the pre-defined amount of time can be 10 seconds.

Figure 6B:
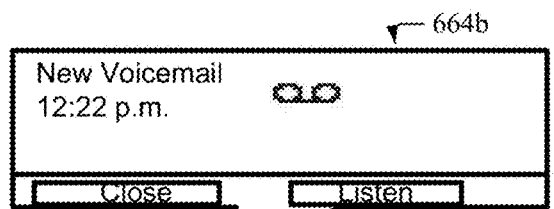
Figure 6C:
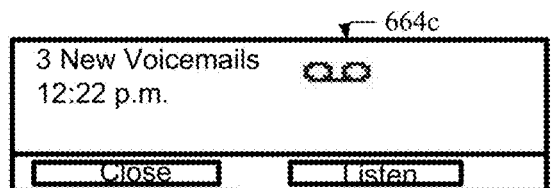
Figure 6D:
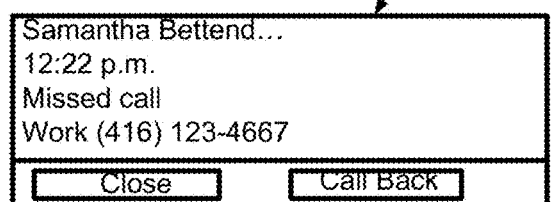
Figure 6E:
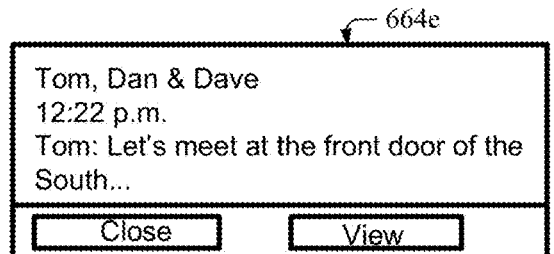

While FIG. 6A displays a portion of a message that is included in the threaded messaging content at the communication device 200, as shown at FIGS. 6B, 6C, 6D and 6E, any number of other types of threaded messaging content can also be displayed while the communication device 200 and/or UI is locked. By way of example, but not limitation, the threaded content displayed can be indicative of a new voicemail (as shown in FIG. 6B), numerous voicemails threaded within a thread (as shown in FIG. 6C), a missed call (as shown in FIG. 6D) and/or a group text message including media (as shown in FIG. 6E).

Figure 7:
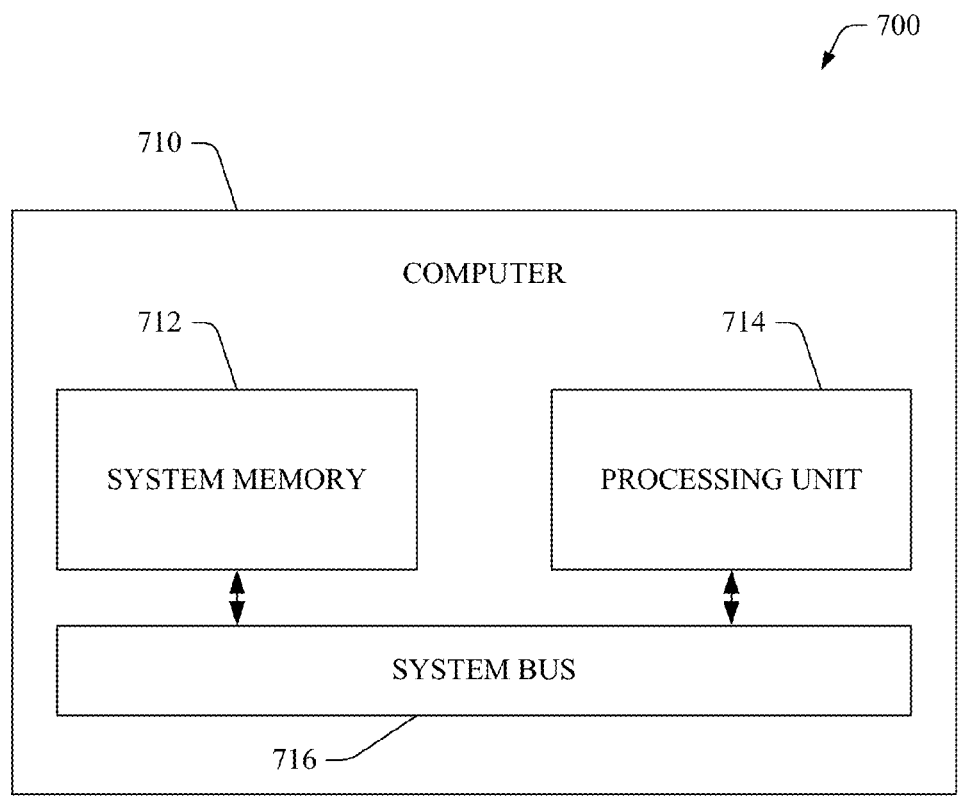
FIG. 7 illustrates an exemplary operating environment that facilitates the systems, apparatus, methods and computer-readable storage media described herein.

FIG. 7 illustrates an exemplary operating environment that facilitates the systems, apparatus and methods described herein. In order to provide additional context for various aspects of the embodiments described herein, FIG. 7 and the following discussion are intended to provide a brief, general description of a computing environment 700 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available media that can be accessed by a computing device and includes both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read-only memory (ROM), random access memory (RAM), Electrically Erasable Programmable Read-Only Memory (EEPROM), flash memory or other memory technology, compact disc read-only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communication media can embody computer-readable instructions, data structures, program modules and/or other structured or unstructured data in a data signal such as a modulated data signal, e.g., a carrier wave or other transport mechanism, and includes any information delivery or transport media. The term "modulated data signal" or "modulated data signals" refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media. Combinations of any of the above can also be included within the scope of communication media. In some embodiments, communication media are capable of subsequently propagating through electrically conductive media, (e.g., such as a system bus, microprocessor, data port, and the like) and/or non-electrically conductive media (e.g., in the form of radio frequency microwave frequency, optical frequency and similar electromagnetic frequency modulated data signals).

In accordance with various aspects, the computing environment 700 for implementing various aspects includes a computer 710, the computer 710 including a processing unit 714, a system memory 712 and a system bus 716. The system bus 716 couples system components including, but not limited to, the system memory 712 to the processing unit 714. The processing unit 714 can be any of various commercially available processors, such a single core processor, a multi-core processor, or any other suitable arrangement of processors. The system bus 716 can be any of several types of bus structure that can further interconnect to a memory bus (with or without a memory controller), a peripheral bus, and a local bus using any of a variety of commercially available bus architectures. The system memory 712 can include ROM, random access memory RAM, high-speed RAM (such as static RAM), erasable programmable read only memory (EPROM), EEPROM, flash memory, and/or the like. Additionally or alternatively, the computer 702 can include a hard disk drive, upon which program instructions, data, and the like can be retained. Moreover, removable data storage can be associated with the computer 710. Hard disk drives, removable media, computer-readable storage media, etc. can be communicatively coupled to the processing unit 714 by way of the system bus 716.

The system memory 712 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 710 through one or more wired/wireless input devices, such as a keyboard, pointing and clicking mechanism, pressure sensitive screen, microphone, joystick, stylus pen, etc. A monitor or other type of interface can also be connected to the system bus 716.

The computer 710 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 710 can connect to other devices/networks by way of antenna, port, network interface adaptor, wireless access point, modem, and/or the like.

The computer 710 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and BLUETOOTH® wireless technologies. Thus, the communication can be a predefined structure as with a conventional network or simply an ad hoc communication between at least two devices.

WiFi allows connection to the Internet from a desired location (e.g., couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11(a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
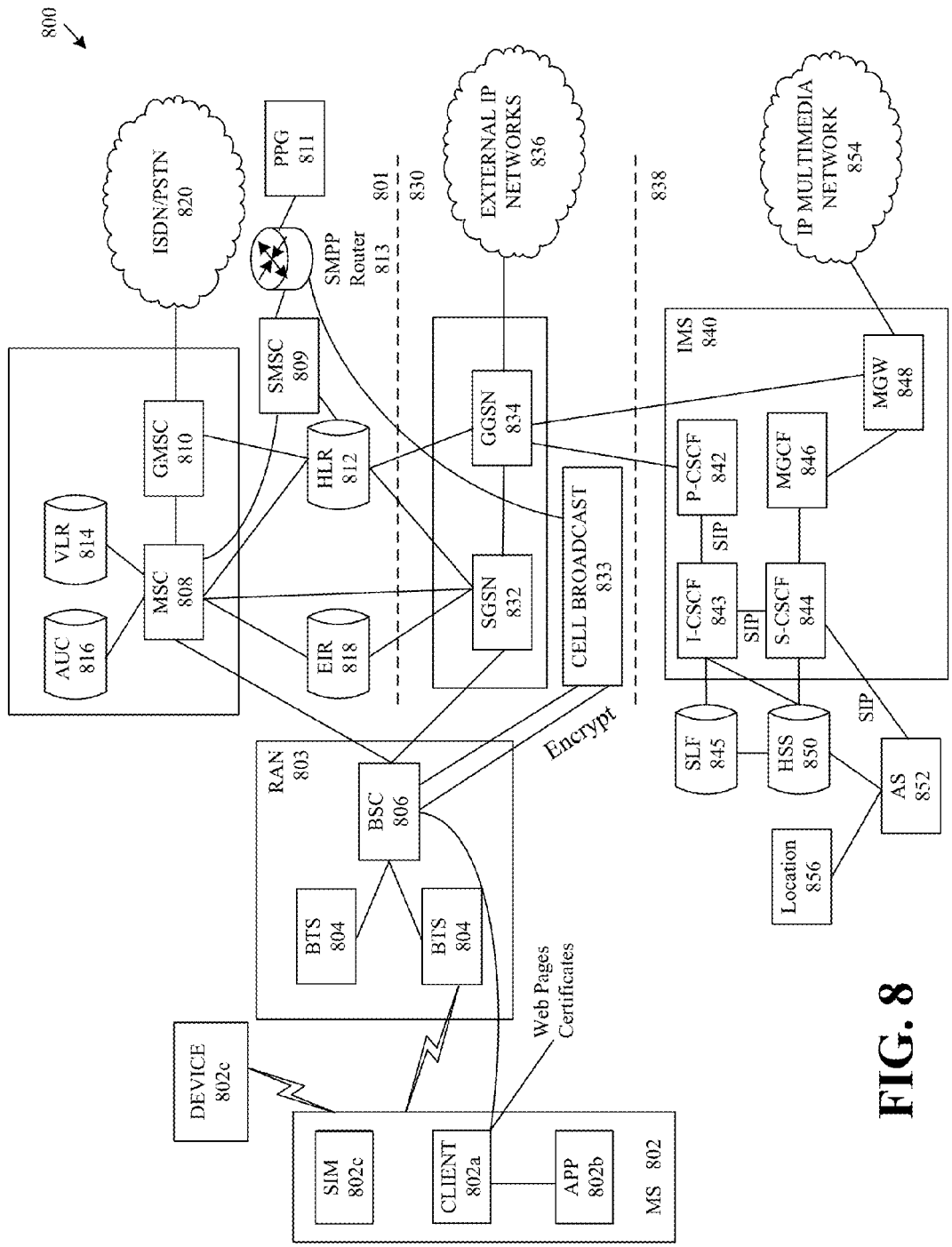
FIG. 8 illustrates an exemplary network environment that facilitates the systems, apparatus, methods and computer-readable storage media described herein.

FIG. 8 illustrates an exemplary network environment that facilitates the systems, apparatus and methods described herein. FIG. 8 depicts a GSM/General packet radio service (GPRS)/IP multimedia network architecture 800 that includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer that is used by mobile subscribers, with a Subscriber identity Module (SIM) 802c. The SIM 802c includes an International Mobile Subscriber Identity (IMSI), which is a unique device identifier of a subscriber. The MS 802 includes an embedded client 802a that receives and processes messages received by the MS 802. The embedded client 802a can be implemented in JAVA and is discuss more fully below.

The embedded client 802a communicates with an application (APP) 802b that provides services and/or information to an end user. One example of the application can be navigation software that provides near real-time traffic information that is received via the embedded client 802a to the end user. The navigation software can provide road conditions, suggest alternate routes, etc., based at least in part on the location of the MS 802. Those of ordinary skill in the art understand that there are many different methods and systems of locating an MS 802.

Alternatively, the MS 802 and a device 802c can be enabled to communicate via a short-range wireless communication link, such as BLUETOOTH® technologies. For example, a BLUETOOTH® SIM Access Profile can be provided in an automobile (e.g., device 802c) that communicates with the SIM 802c in the MS 802 to enable the automobile's communications system to pull information from the MS 802. The BLUETOOTH® communication system in the vehicle becomes an "embedded phone" that employs an antenna associated with the automobile. The result is improved reception of calls made in the vehicle. As one of ordinary skill in the art would recognize, an automobile is one example of the device 802c. There can be an endless number of devices 802c that use the SIM within the MS 802 to provide services, information, data, audio, video, etc. to end users.

The BTS 804 is physical equipment, such as a radio tower, that enables a radio interface to communicate with the MS. Each BTS can serve more than one MS. The BSC 806 manages radio resources, including the BTS. The BSC can be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 88, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. In other words, the GMSC 810 provides interworking functionality with external networks.

The HLR 812 is a data store component or component(s) that comprises administrative information regarding each subscriber registered in a corresponding GSM network. The HLR 812 also includes the current location of each MS. The VLR 814 is a data store component or component(s) that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (e.g., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the data store component as location-updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. In embodiments, the GGSN provides interworking functionality with external networks, and sets up a logical link to the MS through the SGSN. When packet-switched data leaves the GPRS network, it is transferred to an external Transmission Control Protocol (TCP)-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (e.g., call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vice versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber data store component, called a home subscriber server (HSS) 850. The HSS 850 can be common to the GSM network 801, the GPRS network 830 as well as the IP multimedia network 838.

The IP multimedia system 840 is built around the call/session control function (CSCF), of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 can also modify an outgoing request according to a set of rules defined by the network operator (e.g., address analysis and potential modification).

The I-CSCF 843 forms an entrance to a home network and hides the inner topology of the home network from other networks and provides flexibility for selecting an S-CSCF. The I-CSCF 843 can contact a subscriber location function (SLF) 845 to determine which HSS 850 to use for the particular subscriber, if multiple HSS 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISDN User Part (ISUP)/Bearer Independent Call Control (BICC) call control signaling from the external GSTN networks (not shown). It also controls the media gateway (MGW) 848 that provides user-plane interworking functionality (e.g., converting between Adaptive Multi-Rate (AMR)- and Pulse-code modulation (PCM)-coded voice). The MGW 848 also communicates with other IP multimedia networks 854.

In some embodiments, the IP networks 836 described herein include networks communicatively coupled to social networking sites. As such, the networks disclosed herein can also include such IP networks 836 and one or more social networking sites.

It is to be appreciated and understood that components (e.g., UE, AP, core network, security component, UI, overlay component, etc.), as described with regard to a particular system or methodology, can include the same or similar functionality as respective components (e.g., respectively named components, similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store component," data storage," "data store component," "repository", and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include ROM, programmable ROM (PROM), EPROM, EEPROM, phase change memory (PCM), flash memory, or nonvolatile RAM (e.g., ferroelectric RAM (FeRAM)). Volatile memory can include RAM, which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. As another example, an interface can include input/output (I/O) components as well as associated processor, application and/or API components, and can be as simple as a command line or as complex as an Integrated Development Environment (IDE). Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Furthermore, the embodiments can or can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), DVD, Blu-ray disc (BD), . . . ), smart cards, and/or flash memory devices (e.g., card, stick, key drive). Additionally it should be appreciated that a carrier wave can carry computer-readable electronic data (e.g., the data transmitted and received via email and/or to access the Internet or a network such as a LAN). As known to those of ordinary skill in the art, modifications can be made to the above embodiments without departing from the spirit of the disclosure.

Moreover, the word "exemplary" is used herein to mean an example, instance or illustration. Any aspect or design described herein as "exemplary" is not to be construed as preferred or advantageous over other aspects or designs. Rather, use of the word "exemplary" is merely intended to present examples of embodiments. Further, as used herein, the term "or" is intended to mean an inclusive "or" rather than an exclusive "or". That is, unless specified otherwise, or clear from context, "X employs A or B" is intended to mean any of the inclusive permutations (e.g., X employs A, X employs B, X employs A and B). In addition, the articles "a" and "an," as used herein, should be construed to mean "one or more" unless, as specified otherwise, or clear from context, the articles are directed to only a singular form.

As used herein, the terms "infer" or "inference" refer generally to the process of reasoning about or inferring states of the system, apparatus, method, environment, and/or user from a set of observations as captured via events and/or data. By way of examples, but not limitation, inference can be employed to identify a specific context or action, or can generate a probability distribution over states. The inference can be probabilistic (e.g., the computation of a probability distribution over states of interest based on a consideration of data and events). Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

What has been described above includes embodiments of claimed subject matter. It is, of course, not possible to describe every conceivable combination of components or methodologies for purposes of describing the claimed subject matter. However, one of ordinary skill in the art can recognize that many further combinations and permutations of such subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-transitory machine-readable storage medium, comprising executable instructions that, when executed by a processor of a mobile device, facilitate performance of operations, comprising:
   sorting, by the mobile device, content items of messaging content to generate content groups, wherein the sorting comprises grouping respective content items in a same content group of the content groups based on the respective content items being determined to be associated with a same telephone number, and wherein each content group contains a respective voice call and a respective text message;
   threading, by the mobile device, the respective content items for the same content group, resulting in threaded respective content items for the same content; and
   facilitating, by the mobile device, displaying of the threaded respective content items for the same content group, wherein the facilitating the displaying comprises concurrently facilitating a first display of a first group of the threaded respective content items in a first region of a screen of the mobile device, and facilitating a second display of the second group of the threaded respective content items in a second region of the screen of the mobile device.

2. The non-transitory machine-readable storage medium of claim 1, wherein the text message is a multimedia message service message.

3. The non-transitory machine-readable storage medium of claim 1, wherein the messaging content further comprises pictorial information.

4. The non-transitory machine-readable storage medium of claim 1, wherein the messaging content further comprises a news alert.

5. The non-transitory machine-readable storage medium of claim 1, wherein the operations further comprise, prior to the sorting:
   determining, by the mobile device, times at which received content items of the messaging content associated with the same telephone number are received at the communication device.

6. The non-transitory machine-readable storage medium of claim 5, wherein the operations further comprise:
   based on the times, associating, by the mobile device, timestamps with the received content items of the messaging content associated with the same telephone number.

7. The non-transitory machine-readable storage medium of claim 1, wherein the facilitating the displaying of the threaded respective content items further comprises:
   facilitating the displaying, via a user interface of the mobile device, in a thread, the threaded respective content items for the same content group.

8. A method, comprising:
   receiving, by a mobile device comprising a processor, messaging content comprising first information indicative of a text message and second information indicative of a communication distinct from a text message;
   sorting, by the mobile device, the messaging content to generate content groups;
      wherein the sorting comprising grouping a first subset of the messaging content based on the first subset being associated with a first telephone number, and wherein the first subset is associated with a first content group of the content groups such that the first content group contains a first voice call and a first text message, and
      wherein the sorting comprising grouping a second subset of the messaging content based on the second subset being associated with a second telephone number, and wherein the second subset is associated with a second content group of the content groups such that the second content group contains a second voice call and a second text message;
   threading, by the mobile device, the first subset of the messaging content associated with the first telephone number and the first content group based on a first order of receipt of content items within the first subset of the messaging content, resulting in a threaded first subset of the messaging content;
   threading, by the mobile device, the second subset of the messaging content associated with the second telephone number and the second content group based on a second order of receipt of content items within the second subset of the messaging content, resulting in a threaded second subset of the messaging content; and
   facilitating, by the mobile device, displaying, via a user interface of the mobile device, the threaded first subset of the messaging content and the threaded second subset of the messaging content, wherein the facilitating the displaying comprises concurrently facilitating the displaying of the threaded first subset of the messaging content in a first region of a display of the device, and facilitating the displaying of the threaded second subset of the messaging content in a second region of the display of the device.

9. The method of claim 8, wherein the text message comprises a multimedia message service message.

10. The method of claim 8, wherein the messaging content further comprises audio information.

11. The method of claim 8, wherein the messaging content further comprises social networking status updates.

12. The method of claim 8, wherein the messaging content further comprises social networking information.

13. The method of claim 8, further comprising:
determining, by the mobile device, respective times at which items of the messaging content are received; and
associating, by the mobile device, timestamps with the items of the messaging content as a function of the respective times.

14. A mobile device, comprising:
a processor; and
a memory that stores executable instructions that, when executed by the processor, facilitate performance of operations, comprising:
sorting items of content of messaging content resulting in content groups, wherein the messaging content comprises first data that includes voice call data and second data that comprises text message data, wherein the items of content are sorted into a same group of the content groups based on the messaging content being associated with a same telephone number, such that each content group contains the first data and the second data;
generating threaded items of content by threading the items in the same group; and
initiating display of the threaded items in the same group, wherein the initiating the display comprises concurrently initiating the display of a first group of the threaded items of content in a first region of a screen of the apparatus, and initiating the display of a second group of the threaded items of content in a second region of the screen of the apparatus, wherein the first region and the second region are non-overlapping.

15. The mobile device of claim 14, wherein an order of receipt is the order of receipt by the apparatus.

16. The mobile device of claim 14, wherein the second data further comprises a short message service message.

17. The mobile device of claim 14, wherein the second data further comprises data traffic information.

18. The mobile device of claim 14, wherein the second data further comprises news alerts.

19. The mobile device of claim 14, wherein the second data comprises social networking information.

20. The mobile device of claim 14, wherein the second data further comprises stock reports.

\* \* \* \* \*